United States Patent
Constantz et al.

(10) Patent No.: US 8,431,100 B2
(45) Date of Patent: *Apr. 30, 2013

(54) CO$_2$-SEQUESTERING FORMED BUILDING MATERIALS

(75) Inventors: Brent R. Constantz, Portola Valley, CA (US); Andrew Youngs, Los Gatos, CA (US); Terence C. Holland, Auburn Township, OH (US)

(73) Assignee: Calera Corporation, Los Gatos, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/191,209

(22) Filed: Jul. 26, 2011

(65) Prior Publication Data

US 2011/0290156 A1 Dec. 1, 2011

Related U.S. Application Data

(60) Division of application No. 12/826,209, filed on Jun. 29, 2010, now Pat. No. 8,006,446, which is a continuation of application No. 12/571,398, filed on Sep. 30, 2009, now Pat. No. 7,771, 684.

(60) Provisional application No. 61/110,489, filed on Oct. 31, 2008, provisional application No. 61/149,610, filed on Feb. 3, 2009, provisional application No. 61/246,042, filed on Sep. 25, 2009, provisional application No. 61/101, 631, filed on Sep. 30, 2008.

(51) Int. Cl.
*C01B 31/20* (2006.01)
*C04B 18/04* (2006.01)

(52) U.S. Cl.
USPC ...... 423/220; 52/223.6; 52/223.8; 52/223.14; 52/294; 52/309.17; 106/464; 106/719; 423/232; 423/419.1; 423/430; 423/437.1; 423/438; 95/205; 210/710

(58) Field of Classification Search ................ 52/223.1, 52/223.6, 223.8, 223.14, 223.4, 292, 294, 52/309.17, 596; 106/463, 464, 638, 644, 106/719, 720, 724, 728, 729; 210/652, 702, 210/710, 806; 423/220, 223, 232, 419.1, 423/420.2, 430, 431, 437.1, 438, 439, 441; 95/149, 205
See application file for complete search history.

(56) References Cited

U.S. PATENT DOCUMENTS

| | | |
|---|---|---|
| 1,169,766 A | 2/1916 | Brassert |
| 1,172,930 A | 2/1916 | Brassert et al. |

(Continued)

FOREIGN PATENT DOCUMENTS

| | | |
|---|---|---|
| AU | 2001213118 B2 | 12/2001 |
| AU | 2007100157 A4 | 4/2007 |

(Continued)

OTHER PUBLICATIONS

U.S. Appl. No. 60/921,598, filed Apr. 3, 2007, Little et al.

(Continued)

*Primary Examiner* — Joseph Drodge
(74) *Attorney, Agent, or Firm* — Calera Corporation

(57) ABSTRACT

CO$_2$-sequestering formed building materials are provided. The building materials of the invention include a composition comprising a carbonate/bicarbonate component. Additional aspects of the invention include methods of making and using the CO$_2$-sequestering formed building material.

20 Claims, 3 Drawing Sheets

U.S. PATENT DOCUMENTS

Figure 1:
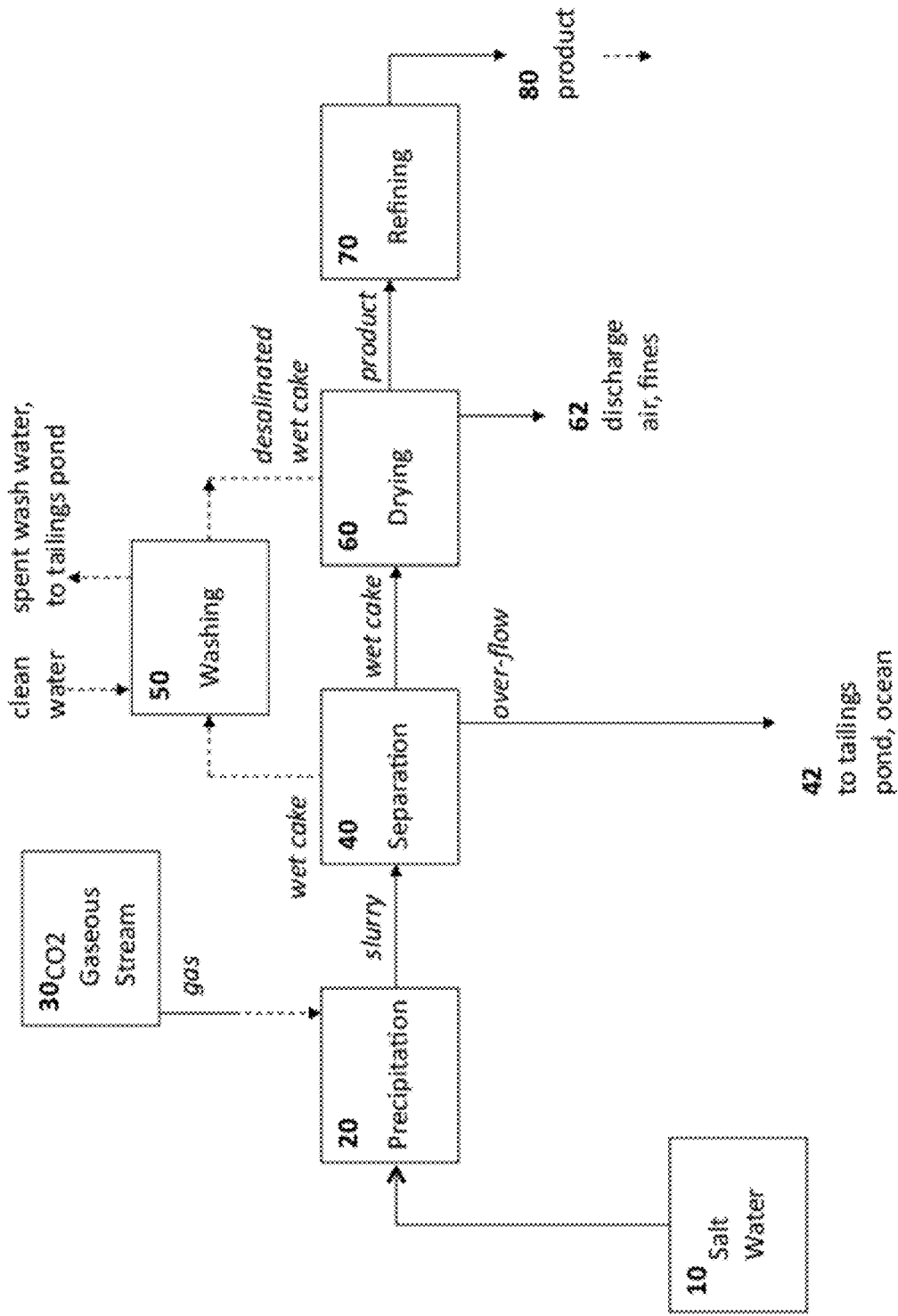

| | | | |
|---|---|---|---|
| 1,176,747 A | 3/1916 | Ferguson |
| 1,493,579 A | 5/1924 | Walter |
| 1,543,942 A | 6/1925 | Mathesius |
| 1,655,171 A | 1/1928 | Wagner |
| 1,678,345 A | 7/1928 | Mattison |
| 1,759,361 A | 5/1930 | Miller |
| 1,785,365 A | 12/1930 | Sell |
| 1,823,269 A | 9/1931 | Grilli |
| 1,865,833 A | 7/1932 | Chesny |
| 1,897,725 A | 2/1933 | Gaus et al. |
| 1,924,503 A | 8/1933 | Lambert |
| 1,986,736 A | 1/1935 | Mauthe et al. |
| 2,006,295 A | 6/1935 | Chewning et al. |
| 2,054,315 A | 9/1936 | Ebner et al. |
| 2,082,101 A | 6/1937 | Dougherty |
| 2,204,771 A | 6/1940 | Rice et al. |
| 2,227,465 A | 1/1941 | Roche, Jr. et al. |
| 2,241,674 A | 5/1941 | Mohr, Jr. et al. |
| 2,242,294 A | 5/1941 | Fox et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,810,450 A | 10/1957 | Hartmann |
| 2,934,419 A * | 4/1960 | Cook ................................. 71/1 |
| 2,967,807 A | 1/1961 | Osborne et al. |
| 3,046,152 A | 7/1962 | Tsuneyoshi |
| 3,120,426 A | 2/1964 | Crawford, Jr. |
| 3,165,460 A | 1/1965 | Zang et al. |
| 3,179,579 A | 4/1965 | Gustave et al. |
| 3,196,092 A | 7/1965 | Beer |
| 3,202,522 A | 8/1965 | Chi-Sun Yang et al. |
| 3,262,865 A | 7/1966 | Waters, Jr. |
| 3,264,125 A | 8/1966 | Bourlin et al. |
| 3,322,574 A | 5/1967 | Justi et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,471,999 A | 10/1969 | Schon |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,816,592 A | 6/1974 | Rinaldi et al. |
| 3,834,129 A | 9/1974 | Darlinger et al. |
| 3,847,632 A | 11/1974 | Blengsli |
| 3,861,928 A | 1/1975 | Slater et al. |
| 3,864,236 A | 2/1975 | Lindstrom |
| 3,904,496 A | 9/1975 | Harke et al. |
| 3,907,526 A | 9/1975 | Saleem et al. |
| 3,917,795 A | 11/1975 | Pelczarski et al. |
| 3,925,534 A | 12/1975 | Singleton et al. |
| 3,953,568 A | 4/1976 | Seko et al. |
| 3,959,419 A | 5/1976 | Kitterman |
| 3,963,592 A | 6/1976 | Lindstrom |
| 3,970,528 A | 7/1976 | Zirngiebl et al. |
| 3,975,503 A | 8/1976 | Hauschild et al. |
| 3,997,303 A | 12/1976 | Newton |
| 4,000,991 A | 1/1977 | Melin, Jr. et al. |
| 4,002,721 A | 1/1977 | Guffy et al. |
| 4,026,716 A | 5/1977 | Urschel III et al. |
| 4,036,749 A | 7/1977 | Anderson |
| 4,045,524 A | 8/1977 | Bornert |
| 4,069,063 A | 1/1978 | Ball |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,263,021 A | 4/1981 | Downs et al. |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,312,646 A | 1/1982 | Fattinger et al. |
| 4,315,872 A | 2/1982 | Senjo et al. |
| 4,335,788 A | 6/1982 | Murphey et al. |
| 4,337,230 A | 6/1982 | Ellestad et al. |
| 4,340,572 A | 7/1982 | Ben-Shmuel et al. |
| 4,361,475 A | 11/1982 | Moeglich |
| 4,363,667 A | 12/1982 | Birchall |
| 4,370,307 A | 1/1983 | Judd |
| 4,376,101 A | 3/1983 | Sartori et al. |
| 4,377,554 A | 3/1983 | Johnson |
| 4,410,606 A | 10/1983 | Loutfy et al. |
| 4,450,009 A | 5/1984 | Childs et al. |
| 4,477,573 A | 10/1984 | Taufen |
| 4,508,545 A | 4/1985 | DeLoach |
| 4,561,945 A | 12/1985 | Coker et al. |
| 4,588,443 A | 5/1986 | Bache |
| 4,620,969 A | 11/1986 | Wilkinson |
| 4,634,533 A | 1/1987 | Somerville et al. |
| 4,670,234 A | 6/1987 | Holter et al. |
| 4,716,027 A | 12/1987 | Morrison |
| 4,738,695 A | 4/1988 | Carr et al. |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,880,447 A | 11/1989 | Bloch |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,141,620 A | 8/1992 | Molter |
| 5,230,734 A | 7/1993 | Kumasaka et al. |
| 5,244,304 A | 9/1993 | Weill et al. |
| 5,246,551 A | 9/1993 | Pletcher et al. |
| 5,275,794 A | 1/1994 | Luna |
| 5,282,935 A | 2/1994 | Cawlfield et al. |
| 5,318,758 A | 6/1994 | Fujii et al. |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,427,608 A | 6/1995 | Auer et al. |
| 5,439,509 A | 8/1995 | Spink et al. |
| 5,470,671 A | 11/1995 | Fletcher et al. |
| 5,520,898 A | 5/1996 | Pinnavaia et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,618,392 A | 4/1997 | Furuya |
| 5,624,493 A | 4/1997 | Wagh et al. |

| | | | | | | |
|---|---|---|---|---|---|---|
| 5,690,729 A | 11/1997 | Jones, Jr. | | 7,132,090 B2 | 11/2006 | Dziedzic et al. |
| 5,702,585 A | 12/1997 | Hillrichs et al. | | 7,135,604 B2 | 11/2006 | Ding et al. |
| 5,749,930 A | 5/1998 | Wolf et al. | | 7,147,692 B2 | 12/2006 | Fornai et al. |
| 5,766,338 A | 6/1998 | Weber | | 7,182,851 B2 | 2/2007 | Gomez |
| 5,766,339 A | 6/1998 | Babu et al. | | 7,198,722 B2 | 4/2007 | Hussain |
| 5,776,328 A | 7/1998 | Traini et al. | | 7,255,842 B1 | 8/2007 | Yeh et al. |
| 5,785,868 A | 7/1998 | Li et al. | | 7,261,912 B2 | 8/2007 | Zeigler |
| 5,792,440 A | 8/1998 | Huege | | 7,282,189 B2 | 10/2007 | Zauderer |
| 5,803,894 A | 9/1998 | Kao et al. | | 7,285,166 B2 | 10/2007 | Luke et al. |
| 5,833,736 A | 11/1998 | Durham et al. | | 7,314,847 B1 | 1/2008 | Siriwardane |
| 5,846,669 A | 12/1998 | Smotkin et al. | | 7,347,896 B2 | 3/2008 | Harrison |
| 5,849,075 A | 12/1998 | Hopkins et al. | | 7,390,444 B2 | 6/2008 | Ramme et al. |
| 5,853,686 A | 12/1998 | Doxsee | | 7,427,449 B2 | 9/2008 | Delaney et al. |
| 5,855,666 A | 1/1999 | Kao et al. | | 7,440,871 B2 | 10/2008 | McConnell et al. |
| 5,855,759 A | 1/1999 | Keating et al. | | 7,452,449 B2 | 11/2008 | Weinberg et al. |
| 5,885,478 A | 3/1999 | Montgomery et al. | | 7,455,854 B2 | 11/2008 | Gower et al. |
| 5,897,704 A | 4/1999 | Baglin | | 7,459,134 B2 | 12/2008 | Cadours et al. |
| 5,925,255 A | 7/1999 | Mukhopadhyay | | 7,541,011 B2 | 6/2009 | Hu |
| 5,958,353 A | 9/1999 | Eyal | | 7,595,001 B2 | 9/2009 | Arakel et al. |
| 5,965,201 A | 10/1999 | Jones, Jr. | | 7,597,747 B1 | 10/2009 | Nagel |
| 6,024,848 A | 2/2000 | Dufner et al. | | 7,628,847 B2 | 12/2009 | Pope et al. |
| 6,059,974 A | 5/2000 | Scheurman, III | | 7,674,443 B1 | 3/2010 | Davis |
| 6,071,336 A | 6/2000 | Fairchild et al. | | 7,704,369 B2 | 4/2010 | Olah et al. |
| 6,080,297 A | 6/2000 | Ayers | | 7,727,374 B2 | 6/2010 | Jones |
| 6,080,320 A | 6/2000 | von Phul | | 7,735,274 B2 | 6/2010 | Constantz et al. |
| 6,090,197 A | 7/2000 | Vivian et al. | | 7,736,430 B2 * | 6/2010 | Barron et al. .............. 106/705 |
| 6,129,832 A | 10/2000 | Fuhr et al. | | 7,744,761 B2 | 6/2010 | Constantz et al. |
| 6,139,605 A | 10/2000 | Carnell et al. | | 7,749,476 B2 | 7/2010 | Constantz et al. |
| 6,174,507 B1 | 1/2001 | Wallace et al. | | 7,753,618 B2 | 7/2010 | Constantz et al. |
| 6,180,012 B1 | 1/2001 | Rongved | | 7,754,169 B2 | 7/2010 | Constantz et al. |
| 6,186,426 B1 | 2/2001 | Killer | | 7,771,684 B2 * | 8/2010 | Constantz et al. .......... 423/220 |
| 6,190,428 B1 | 2/2001 | Rolison et al. | | 7,790,012 B2 | 9/2010 | Kirk et al. |
| 6,200,381 B1 | 3/2001 | Rechichi | | 7,815,880 B2 | 10/2010 | Constantz et al. |
| 6,200,543 B1 | 3/2001 | Allebach et al. | | 7,829,053 B2 | 11/2010 | Constantz et al. |
| 6,217,728 B1 | 4/2001 | Lehmann et al. | | 7,875,163 B2 | 1/2011 | Gilliam et al. |
| 6,221,225 B1 | 4/2001 | Mani | | 7,887,694 B2 | 2/2011 | Constantz et al. |
| 6,228,145 B1 | 5/2001 | Falk-Pedersen et al. | | 7,906,028 B2 | 3/2011 | Constantz et al. |
| 6,235,186 B1 | 5/2001 | Tanaka et al. | | 7,914,685 B2 | 3/2011 | Constantz et al. |
| 6,248,166 B1 | 6/2001 | Solsvik | | 7,922,809 B1 | 4/2011 | Constantz et al. |
| 6,251,356 B1 | 6/2001 | Mathur | | 7,931,809 B2 | 4/2011 | Constantz et al. |
| 6,264,736 B1 | 7/2001 | Knopf et al. | | 7,939,336 B2 | 5/2011 | Constantz et al. |
| 6,264,740 B1 | 7/2001 | McNulty, Jr. | | 7,966,250 B2 | 6/2011 | Constantz et al. |
| 6,280,505 B1 | 8/2001 | Torkildsen et al. | | 7,993,500 B2 | 8/2011 | Gilliam et al. |
| 6,293,731 B1 | 9/2001 | Studer | | 7,993,511 B2 | 8/2011 | Gilliam et al. |
| 6,309,570 B1 | 10/2001 | Fellabaum | | 8,006,446 B2 * | 8/2011 | Constantz et al. .......... 52/223.1 |
| 6,331,207 B1 | 12/2001 | Gebhardt | | 2001/0022952 A1 | 9/2001 | Rau et al. |
| 6,352,576 B1 | 3/2002 | Spencer et al. | | 2001/0023655 A1 | 9/2001 | Knopf et al. |
| 6,375,825 B1 | 4/2002 | Mauldin et al. | | 2001/0054253 A1 | 12/2001 | Takahashi et al. |
| 6,387,174 B2 | 5/2002 | Knopf et al. | | 2002/0009410 A1 | 1/2002 | Mathur |
| 6,387,212 B1 | 5/2002 | Christian | | 2002/0127474 A1 | 9/2002 | Fleischer et al. |
| 6,402,831 B1 | 6/2002 | Sawara et al. | | 2002/0151017 A1 | 10/2002 | Stemmer et al. |
| 6,416,574 B1 | 7/2002 | Steelhammer et al. | | 2002/0155103 A1 | 10/2002 | Crippen et al. |
| 6,428,767 B1 | 8/2002 | Burch et al. | | 2003/0017088 A1 | 1/2003 | Downs et al. |
| 6,444,107 B2 | 9/2002 | Hartel et al. | | 2003/0027023 A1 | 2/2003 | Dutil et al. |
| 6,447,437 B1 | 9/2002 | Lee et al. | | 2003/0123930 A1 | 7/2003 | Jacobs et al. |
| 6,475,460 B1 | 11/2002 | Max | | 2003/0126899 A1 | 7/2003 | Wolken |
| 6,495,013 B2 | 12/2002 | Mazur et al. | | 2003/0146163 A1 | 8/2003 | Sasowsky et al. |
| 6,517,631 B1 | 2/2003 | Bland | | 2003/0188668 A1 | 10/2003 | Bland |
| 6,518,217 B2 | 2/2003 | Xing et al. | | 2003/0213937 A1 | 11/2003 | Yaniv |
| 6,537,456 B2 | 3/2003 | Mukhopadhyay | | 2003/0229572 A1 | 12/2003 | Raines et al. |
| 6,602,630 B1 | 8/2003 | Gopal | | 2004/0014845 A1 | 1/2004 | Takamura et al. |
| 6,613,141 B2 | 9/2003 | Key, Jr. | | 2004/0028963 A1 | 2/2004 | Kormann et al. |
| 6,620,856 B1 | 9/2003 | Mortimer et al. | | 2004/0040671 A1 | 3/2004 | Duesel, Jr. et al. |
| 6,623,555 B1 | 9/2003 | Haverinen et al. | | 2004/0040715 A1 | 3/2004 | Wellington et al. |
| 6,638,413 B1 | 10/2003 | Weinberg et al. | | 2004/0052865 A1 | 3/2004 | Gower et al. |
| 6,648,949 B1 | 11/2003 | Der et al. | | 2004/0109927 A1 | 6/2004 | Ang et al. |
| 6,712,946 B2 | 3/2004 | Genders et al. | | 2004/0111968 A1 | 6/2004 | Day et al. |
| 6,755,905 B2 | 6/2004 | Oates et al. | | 2004/0126293 A1 | 7/2004 | Geerlings et al. |
| 6,776,972 B2 | 8/2004 | Vohra et al. | | 2004/0139891 A1 | 7/2004 | Merkley et al. |
| 6,786,963 B2 | 9/2004 | Matherly et al. | | 2004/0151957 A1 | 8/2004 | Brooks et al. |
| 6,841,512 B1 | 1/2005 | Fetcenko et al. | | 2004/0213705 A1 | 10/2004 | Blencoe et al. |
| 6,881,256 B2 | 4/2005 | Orange et al. | | 2004/0219090 A1 | 11/2004 | Dziedzic et al. |
| 6,890,419 B2 | 5/2005 | Reichman et al. | | 2004/0224214 A1 | 11/2004 | Vamos et al. |
| 6,890,497 B2 | 5/2005 | Rau et al. | | 2004/0228788 A1 | 11/2004 | Nagai et al. |
| 6,908,507 B2 | 6/2005 | Lalande et al. | | 2004/0231568 A1 | 11/2004 | Morioka et al. |
| 6,936,573 B2 | 8/2005 | Wertz et al. | | 2004/0234443 A1 | 11/2004 | Chen et al. |
| 6,938,425 B2 | 9/2005 | Simpson et al. | | 2004/0259231 A1 | 12/2004 | Bhattacharya |
| 7,037,434 B2 | 5/2006 | Myers et al. | | 2004/0267077 A1 | 12/2004 | Ding et al. |
| 7,040,400 B2 | 5/2006 | de Rouffignac et al. | | 2005/0002847 A1 | 1/2005 | Maroto-Valer et al. |

| | | |
|---|---|---|
| 2005/0011770 A1 | 1/2005 | Katsuyoshi et al. |
| 2005/0031515 A1 | 2/2005 | Charette |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0103234 A1* | 5/2005 | McNulty ................... 106/712 |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0252215 A1 | 11/2005 | Beaumont |
| 2005/0255174 A1 | 11/2005 | Shelley et al. |
| 2006/0039853 A1 | 2/2006 | Fan et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0093540 A1 | 5/2006 | Fan et al. |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0186562 A1 | 8/2006 | Wright et al. |
| 2006/0189837 A1 | 8/2006 | Forrester |
| 2006/0195002 A1 | 8/2006 | Grandjean et al. |
| 2006/0196836 A1 | 9/2006 | Arakel et al. |
| 2006/0249380 A1 | 11/2006 | Gestermann et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0084344 A1 | 4/2007 | Moriya et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0184394 A1 | 8/2007 | Comrie |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0233616 A1 | 10/2007 | Richards et al. |
| 2007/0240570 A1 | 10/2007 | Jadhav et al. |
| 2007/0251393 A1 | 11/2007 | Pope et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0035036 A1 | 2/2008 | Bassani et al. |
| 2008/0059206 A1 | 3/2008 | Jenkins |
| 2008/0099122 A1 | 5/2008 | Andersen et al. |
| 2008/0104858 A1 | 5/2008 | Carin et al. |
| 2008/0112868 A1 | 5/2008 | Blencoe et al. |
| 2008/0134891 A1 | 6/2008 | Jarvenpaa |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0213146 A1 | 9/2008 | Zauderer |
| 2008/0223727 A1 | 9/2008 | Oloman et al. |
| 2008/0233029 A1 | 9/2008 | Fan et al. |
| 2008/0236143 A1 | 10/2008 | Lo |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0276803 A1 | 11/2008 | Molaison et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081093 A1 | 3/2009 | Comrie |
| 2009/0081096 A1 | 3/2009 | Pellegrin |
| 2009/0081112 A1 | 3/2009 | Virtanen |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0120288 A1 | 5/2009 | Lackner |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0068109 A1 | 3/2010 | Comrie |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |

| | | | |
|---|---|---|---|
| 2011/0079515 A1 | 4/2011 | Gilliam et al. | |
| 2011/0083968 A1 | 4/2011 | Gilliam et al. | |
| 2011/0091366 A1 | 4/2011 | Kendall et al. | |
| 2011/0091955 A1 | 4/2011 | Constantz et al. | |
| 2011/0132234 A1 | 6/2011 | Constantz et al. | |
| 2011/0147227 A1 | 6/2011 | Gilliam et al. | |

FOREIGN PATENT DOCUMENTS

| | | |
|---|---|---|
| AU | 2007201171 A1 | 10/2007 |
| AU | 2007101174 A4 | 1/2008 |
| AU | 2008256636 B2 | 12/2008 |
| AU | 2008101140 A4 | 1/2009 |
| CA | 1303822 C | 6/1988 |
| CA | 1335974 A1 | 6/1995 |
| CA | 2308224 C | 4/1999 |
| CA | 2255287 A1 | 6/2000 |
| CA | 2353830 A1 | 6/2000 |
| CA | 2440325 | 1/2003 |
| CA | 2646462 | 9/2007 |
| CA | 2617325 A1 | 11/2007 |
| CA | 2682952 A1 | 10/2008 |
| CA | 2659447 A1 | 12/2008 |
| CN | 101219330 A | 7/2008 |
| CN | 101289200 A | 10/2008 |
| DE | 2653649 A1 | 6/1978 |
| DE | 3146326 A1 | 6/1983 |
| DE | 3638317 A1 | 6/1987 |
| DE | 19512163 A1 | 10/1995 |
| DE | 19523324 A1 | 3/1996 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| EP | 2253600 A1 | 11/2010 |
| GB | 911386 A | 11/1962 |
| GB | 1392907 | 5/1975 |
| GB | 2032441 | 5/1980 |
| GB | 2050325 A | 1/1981 |
| GB | 2208163 A | 3/1989 |
| GB | 2210035 A | 6/1989 |
| GB | 2371810 A | 8/2002 |
| JP | 51102357 A1 | 9/1976 |
| JP | 59100280 | 6/1984 |
| JP | 63-312988 A2 | 12/1988 |
| JP | 03-020491 A2 | 1/1991 |
| JP | 03-170363 A | 7/1991 |
| JP | 04-317721 A | 11/1992 |
| JP | 7061842 A | 3/1995 |
| JP | 10287461 A | 10/1998 |
| JP | 10305212 A | 11/1998 |
| JP | 2000226402 A | 8/2000 |
| JP | 03184892 B2 | 7/2001 |
| JP | 2002-273163 A | 9/2002 |
| JP | 2003041388 | 2/2003 |
| JP | 2004-174370 | 6/2004 |
| JP | 2005-052762 | 3/2005 |
| JP | 2006-076825 | 3/2006 |
| JP | 2009279530 A | 12/2009 |
| NL | 7607470 A | 1/1978 |
| RU | 1819854 A1 | 9/1993 |
| WO | WO 93/16216 A1 | 8/1993 |
| WO | WO 94/18119 | 8/1994 |
| WO | WO 96/34997 A1 | 11/1996 |
| WO | WO 99/13967 A1 | 3/1999 |
| WO | WO 2006/009600 A2 | 1/2000 |
| WO | WO 01/07365 A1 | 2/2001 |
| WO | WO 01/96243 A1 | 12/2001 |
| WO | WO 02/00551 A2 | 1/2002 |
| WO | WO 02/085788 A1 | 10/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/034339 A1 | 3/2006 |
| WO | WO 2006/036396 A2 | 4/2006 |
| WO | WO 2006/099599 A2 | 9/2006 |
| WO | WO 2006/113997 A1 | 11/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/022595 A1 | 3/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/148055 A1 | 12/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/102816 A2 | 8/2009 |
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |

| | | | |
|---|---|---|---|
| WO | WO 2011/049996 A1 | 4/2011 | |
| WO | WO 2011/066293 A1 | 6/2011 | |
| WO | WO 2011/075680 A1 | 6/2011 | |
| WO | WO 2011/081681 A1 | 7/2011 | |

OTHER PUBLICATIONS

Bagotsky, V.S. 2006. Conductive Polymers: Polymers with Ionic Functions. *Fundamentals of Electrochemistry*. Second Edition. New Jersey: John Wiley & Sons. pp. 454-455.

Bauer, C.F., et al. 1981. Identification and Quantitation of Carbonate Compounds in Coal Fly Ash. *American Chemical Society*. 15(7): 783-788.

Bommaraju, T.V. et al. 2001. Brine Electrolysis. <http://electrochem.cwru.edu/encycl/art-b01-brine.htm>. Retrieved on Oct. 6, 2010. pp. 1-25.

Bradfield, D.L. 1984. Conventional Uranium Processing: The Yeelirrie Uranium Project. *Practical Hydromet '83—7th Annual Symposium on Uranium and Precious Metals*. pp. 39-47. Lakewood, CO.

Constantz, B. 2009. The Risk of Implementing New Regulations on Game-Changing Technology: Sequestering CO2 in the Built Environment. AGU, 90(22), Jt. Assem, Suppl., Abstract.

Eldorado Beaverlodge Operation. 1960. *Canadian Mining Journal*. 81(6): 111-138.

Eurodia. Bipolar Membrane Electrodialysis. Available online as of 2001.; visited Oct. 6, 2010 at http://www.eurodia.com/html/eb.html.

Gillery et al. Bipolar membrane electrodialysis: the time has finally come! Presented 16th Intl. Forum on Appl. Electrochem; Cleaner Tech.-Challenges and Solutions. Nov. 10-14, 2002. Amelia Island Plantation, FL. 4 pages. Retrieved form the Internet on Aug. 14, 2009. http://www.ameridia.com/html.ebc.html.

Golden, D.C., et al. 2001. A Simple Inorganic Process for Formation of Carbonates, Magnetite, and Sulfides in Martian Meteorite ALH84001. *American Mineralogist*. 86: 370-375.

Gregerson, J. 1999. Conquering Corrosion (in concrete). *Building Design & Construction*. 40(8): 50.

Hassan, A.M. et al. 1989. Corrosion Resistant Materials for Seawater RO Plants. *Desalination*. 74: 157-170.

Hein, J.R. et al. 2006. Methanogen c calc te, $^{13}$C-depleted b valve shells, and gas hydrate from a mud volcano offshore southern Cal fora a. *Geological Society of America*. 34(2): 109-112.

Horii, Y. et al. 2007. Novel evidence for natural formation of dioxins in ball clay. *Chemosphere*. 70: 1280-1289.

International Search Report dated Jan. 20, 2009 of PCT/US2007/010032.

International Search Report dated Apr. 13, 2011 of PCT/US10/57821.

International Search Report dated Mar. 21, 2011 of EP10739828.1.
International Search Report dated Mar. 25, 2011 of EP10739829.9.
International Search Report dated Mar. 25, 2011 of EP10737735.0.
International Search Report dated Mar. 4, 2011 of EP10737736.8.
International Search Report dated Dec. 14, 2010 of EP09812408.4.
International Search Report dated Jul. 29, 2010 of EP08873036.1.
International Search Report dated Jan. 4, 2011 of EP09818485.6.
International Search Report dated Apr. 6, 2011 of EP10192919.8.
International Search Report dated May 18, 2011 of EP09812407.6.
International Search Report dated Apr. 19, 2011 of PCT/US2010/059835.
International Search Report dated Jul. 7, 2010 of PCT/US10/026880.
International Search Report dated Jul. 9, 2010 of PCT/US10/025970.
International Search Report dated Sep. 13, 2010 of PCT/US10/035041.

Jensen, P. et al. 1992. 'Bubbling reefs' in the Kattegat: submarine landscapes of carbonate-cemented rocks support a diverse ecosystem at methane seeps. *Marine Ecology Progress Series*. 83: 103-112.

Li, et al., "Using Electrolytic Method to Promote CO2 Sequestration in Serpentine by Mineral Carbonation," Journal of China University of Mining and Technology, 36(6), pp. 817-821 (2007) (In Chinese, with English translation).

Lopez-Capel, E. et al. 2005. Application of simultaneous thermal analysis mass spectrometry and stable carbon isotope analysis in a carbon sequestration study. *Rapid Communications in Mass Spectrometry*. 19: 3192-3198.

Merritt, R.C. 1971. Carbonate Leaching. *The Extractive Metallurgy of Uranium*: pp. 82-97. Colorado School of Mines Research Institute. Prepared Under Contract with the United States Atomic Energy Commission.

Perkins, S. 2004. Sea Change: Carbon Dioxide Imperils Marine Ecosystems. *Science News*. 166(3): 35.

Sample, J.C. et al. 1995. Isotope Geochemistry of Syntectonic Carbonate Cements and Veins from the Oregon Margin: Implications for the Hydrogelogic Evolution of the Accretionary Wedge. *Proceedings of the Ocean Drilling Program, Scientific Results*. 146: 137-148.

Sakata, M. 1987. Movement and Neutralization of Alkaline Leachate at Coal Ash Disposal Sites. *Environ. Sci. Technol*. 21(8): 771-777.

Shaffer, R. 2008. A Devlish Green Angel. *Fast Company*. N127: 92-97.

Skrzypek, G. et al. 2006. $\delta^{13}$ C analyses of calcium carbonate: comparison between the GasBench and elemental analyzer techniques. *Rapid Communications in Mass Spectrometry*. 20: 2915-2920.

Socolow, R. 1997. Fuels Decarbonization and Carbon Sequestration: Report of a Workshop. Center for Energy and Environmental Studies School of Engineering and Applied Science. Princeton University, Princeton, NJ.

Soong, Y. et al. 2004. Experimental and simulation studies on mineral trapping of CO2 with brine. *Energy Conversion and Management*. 45: 1845-1859.

Technology for Commercialization of Slag. 1995. *New Technology Japan*. ISSN: 0385-6542. p. 35.

Zhang, C.L. et al. 2001. Temperature-dependent oxygen and carbon isotope fractionations of biogenic siderite. *Geochimica et Cosmochimica Acta*. 65(14): 2257-2271.

Aker, "Aker Clean Carbon, Carbon Capture Solutions Provider" Aker Clean Carbon Presentation for UN's IPCC; Jan. 24, 2008; 8pp.

Alexander, G. et al., "Evaluation of reaction variables in the dissolution of serpentine for mineral carbonation"; Elsevier; ScienceDirect Fuel 86 (2007) 273-281.

Allen, L.M. 1992. Boron and Sulfur Isotopic Fractionation in the Coal Combustion System. A Thesis Submitted to the Faculty of the Department of Hydrology and Water Resources. The University of Arizona.

Avery, G.B. et al. 2006. Carbon isotopic characterization of dissolved organic carbon in rainwater: Terrestrial and marine influences. Science Direct. 40(39): 7539-7545. Retrieved from the internet on May 20, 2010.

Back, M. et al.,"Reactivity of Alkaline Lignite Fly Ashes Towards CO in Water." Environmental Science & Technology. vol. 42, No. 12 (2008) pp. 4520-4526.

Baer, D.S., et al. 2002. Sensitive absorption measurements in the near-infrared region using off-axis integrated-cavity-output spectroscopy. Appl. Phys. B. 5 pages.

Berg et al., "A 3-Hydroxyproprionate/ 4-Hydroxybutyrate Autotrophic Carbon Dioxide Assimilation Pathway in Archea"; Science, Dec. 14, 2007; vol. 318, No. 5857 DOI 10.1126/science 1149976; pp. 1782-1786.

Biello, D. Cement from CO2: A Concrete Cure for Global Warming? Scientific American Aug. 7, 2008., pp. 1-3 [online] [retrieved on Dec. 12, 2009] <URL: http://www.scientificamerican.com/article.cfm>.

Biennier, L., et al. 2004. Multiplex integrated cavity output spectroscopy of cold PAH cations. Chemical Physics Letters. 387: 287-294.

"Biomass Burning: A Hot Issue in Global Change." National Aeronautics and Space Administration. Langley Research Center, Hampton, Virginia Fact Sheet FS-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. American Geophysical Union Abstract #U22A-07.

Bottomley, D.J. et al. 1999. The origin and evolution of Canadian Shield brines: evaporation or freezing of seawater? New lithium isotope and geochemical evidence from the Slave craton. Chemical Geology. 155: 295-320.

Cannell, M.G.R. 2003. "Carbon sequestration and biomass energy offset: theoretical, potential and achievable capacities globally, in Europe and the UK." Biomass and Bioenergy. 24: 97-116.

Carbon Sequestration. National Energy Technology Laboratory, Jul. 1, 2008 (online) [retrieved on Dec. 12, 2009] <URL: http://web.archive.org/web/20080701213124/http://www.netl.doe.gov/technologies/carbon_seq/index.html>.

Cerling, T.E. 1984. The stable isotopic composition of modern soil carbonate and its relationship to climate. Earth and Planetary Science Letters. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

CICCS "Aims and Research"; www.nottingham.ac.uk/carbonmanagement/ccs_aims.php 2pp Aug. 3, 2007.

Criss, R.E. 1995. Stable Isotope Distribution: Variations from Temperature, Organic and Water-Rock Interactions. Washington University, St. Louis, Department of Earch and Planetary Sciences. American Geophysical Union. pp. 292-307.

Dickens, A. et al. 2004. Reburial of fossil organic carbon in marine sediments. Nature. 427: 336-339. Retrieved from the internet on May 20, 2010.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

"Electrochemical cell", Wikipedia (2009), http:en.wikipedia.org/wiki/Electrochemical_Cell, Nov. 24, 2009, 5 pages.

Elswick, E.R., et al. 2007. Sulfur and carbon isotope geochemistry of coal and derived coal-combustion by-products: An example from an Eastern Kentucky mine and power plant. Applied Geochemistry. 22: 2065-2077.

Fallick, A.E., et al. 1991. A Stable Isotope Study of the Magnesite Deposits Associated with the Alpine-Type Ultramafic Rocks of Yugoslavia. Economic Geology. 86: 847-861.

Faure, et al. 1963. The Isotopic Composition of Strontium in Oceanic and Continental Basalts: Application to the Origin of Igneous Rocks. Journal of Petrology. 4(1): 31-50. (abstract only). Http://petrology.oxfordjournals.org/cgi/content/abstract/4/1/31 (retrieved on Jun. 1, 2010).

Faverjon, F. et al. 2005. Electrochemical study of a hydrogen diffusion anode-membrane assembly for membrane electrolysis. Electrochimica Acta 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). Journal of Sedimentary Research. 70(3): 565-585.

Gain, E. et al. 2002 Ammonium nitrate wastewater treatment by coupled membrane electrolysis and electrodialysis. Journal of Applied Electrochemistry 32: 969-975.

Genders, D. 1995. Electrochemical Salt Splitting. http://www.electrosynthesis.com/news/mwatts.html (accessed Feb. 5, 2009).

Goldberg et al. Jun. 2009. "CO2 Mineral Sequestration Studies in US"; National Energy Technology Laboratory; goldberg@netl.doe.gov; 10pp.

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.geeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.geeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.geeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C. 16pp.

Holdgate, G.R., et al. 2009. Eocene-Miocene carbon-isotope and floral record from brown coal seams in the Gippsland Basin of southeast Australia. Global and Planetary Change. 65: 89-103.

Holze, S. et al. 1994. Hydrogen Consuming Anodes for Energy Saving in Sodium Sulphate Electrolysis. Chem. Eng. Technol. 17: 382-389.

Horkel, K., et al. 2009. Stable isotopic composition of cryptocrystalline magnesite from deposits in Turkey and Austria. Geophysical Research Abstracts. 11. (abstract only).

Horner, G. et al. 2004. Isotope selective analysis of CO2 with tunable diode laser (TDL) spectroscopy in the NIR. The Analyst. 129: 772-778.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huijgen, W.J.J., et al. 2005. Mineral CO2 Sequestration by Steel Slag Carbonation. Environ. Sci. Technol. 39: 9676-9682.

Huijgen, W.J.J., et al. 2006. Energy Consumption and Net CO2 Sequestration of Aqueous Mineral Carbonation. Ind. Eng. Chem. Res. 45: 9184-9194.

Huntzinger, D.N. et al. 2009. A life-cycle assessment of Portland cement manufacturing: comparing the traditional process with alternative technologies. Journal of Cleaner Production. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]<URL: http://www.geo.mtu.edu/~dnhuntzi/DNHuntzingerETD.pdf>.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 3, 2010 of EP08867440.3.

International Search Report dated May 6, 2010 of EP09716193.9.

International Search Report dated Jun. 22, 2010 of EP08772151.0.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.
International Search Report dated Dec. 14, 2009 of PCT/US09/061748.
International Search Report dated Jan. 4, 2010 of PCT/US09/062795.
International Search Report dated Jan. 13, 2010 of PCT/US09/059135.
International Search Report dated Feb. 2, 2010 of PCT/US09/059141.
International Search Report dated Feb. 24, 2010 of PCT/US09/067764.
International Search Report dated Mar. 10, 2010 of PCT/US10/022935.
International Search Report dated May 21, 2010 of PCT/US09/064117.
"Isotopic Signature", Wikipedia (2010), http://en.wikipedia.org/wiki/Isotopic_signature, Apr. 14, 2009, 3 pp.
Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.
Kohlmann et al., "Carbon Dioxide Emission Control by Mineral Carbonation: The Option for Finland"; Infub 6th European Conference on Industrial Furnaces and Boilers Estoril Lisbon Portugal, Apr. 2-5, 2002 10pp.
Lackner, K. "Carbonate Chemistry for Sequestering Fossil Carbon"; Annual Review Energy Environ. 2002 27:193-232.
Lackner, K.S. et al. "Carbon Dioxide Disposal in Carbonate Minerals." Energy. 1995. 20(11): 1153-1170.
Levy, D. "Burnt biomass causes short-term global cooling, long-term warming." http://news-service.stanford.edu/news/2004/august4/biomass-84.html. 3 pages.
Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.
Mazrou, S., et al. 1997. Sodium hydroxide and hydrochloric acid generation from sodium chloride and rock salt by electro-electrodialysis. Journal of Applied Electrochemistry 27: 558-567.
McCrea, J.M. 1950. On the Isotopic Chemistry of Carbonates and a Paleotemperature Scale. The Journal of Chemical Physics. 18(6): 849-857.
Melezhik, V.A., et al. 2001. Palaeoproterozoic magnesite: lithological and isotopic evidence for playa/sabkha environments. Sedimentology. 48: 379-397.
Mihalcea, R.M., et al. 1998. Diode-laser absorption measurements of $CO_2$ near 2.0 μm at elevated temperatures. Applied Optics. 37(36): 8341-8347.
Miljevic, N., et al. 2007. Potential Use of Environmental Isotopes in Pollutant Migration Studies. Environmental Isotopes in Pollutant Studies. 58: 251-262.
Montes-Hernandez, G. et al.,"Mineral sequestration of $CO_2$ by aqueous carbonation of coal combustion fly-ash." Journal of Hazardous Materials vol. 161 (2009). pp. 1347-1354.
Mook, W.G., et al. 1968. Isotopic Equilibrium between Shells and Their Environment. Science. 159(3817): 874-875.
Mook, W.G., et al. 1974. Carbon Isotope Fractionation Between Dissolved Bicarbonate and Gaseous Carbon Dioxide. 22:169-176.
Mottana, A. et al. 1979. Der grosse Mineralienfuhrer, Blv Verlagsgesel lschaft mbH, Munchen, XP002577921, p. 194. (In German with English Translation).
Nayak, V.S. "Nonelectrolytic Production of Caustic Soda and Hydrochloric Acid from Sodium Chloride"; Ind. Eng. Chem. Res. 1996. 35: 3808-3811.
Noda, H., et al. 1990. Electrochemical Reduction of Carbon Dioxide at Various Metal Electrodes in Aqueous Potassium Hydrogen Carbonate Solution. The Chemical Society of Japan. 63: 2459-2462.
O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May (2001) 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.
O'Neil, J.R., et al. 1971. C13 and O18 compositions in some freshwater carbonates associated with ultramafic rocks and serpentines: western United States. Geochimica et Cosmochimica Acta. 35: 687-697.
Park, A., et al. 2004. $CO_2$ mineral sequestration: physically activated dissolution of serpentine and pH swing process. Chemical Engineering Science 59 (22-23): 5241-5247.
Philp, R.P. 2007. The emergence of stable isotopes in environmental and forensic geochemistry studies: a review. Environ Chem Lett. 5:57-66.
Portier et al. 2005. Modelling $CO_2$ solubility in pure water and NaCl-type waters from 0 to 300° C and from 1 to 300 bar Application to the Utsira Formation at Sleipner. Chemical Geology. 217: 187-199.
Power, I.M., et al. 2007. Biologically induced mineralization of dypingite by cyanobacteria from an alkaline wetland near Atlin, British Columbia, Canada. Geochemical Transactions. 8: 16 pages.
Quay, P.D., et al. 1992. Oceanic Uptake of Fossil Fuel $CO$_2$: Carbon—13 Evidence. Science. 256 (5053): 74-79.
Rahardianto et al., "High recovery membrane desalting of low-salinity brackish water: Integration of accelerated precipitation softening with membrane RO"; Science Direct; Journal of Membrane Science 289 (2007) 123-137.
Rakib, M. et al. 1999. Behaviour of Nafion® 350 membrane in sodium sulfate electrochemical splitting: continuous process modelling and pilot scale tests. Journal of Applied Electrochemistry. 29: 1439-1448.
Rau, G. 2004. Possible use of Fe/$CO_2$ fuel cells for $CO_2$ mitigation plus H2 and electricity production. Energy Conversion and Management. 45: 2143-2152.
Raz et al., "Formation of High-Magnesium Calcites via an Amorphous Precursor Phase: Possible Biological Implications"; Advanced Materials; Adv. Mater. (2000) vol. 12, No. 1; 5pp.
Rosenthal, E., "Cement Industry is at Center of Climate Change Debate" New York Times; www.nytimes.com/2007/10/26/business/worldbusiness/26cement.html"ref=todayspaper; 4pp.
Saad, N. et al. 2009. Measurement of Isotopic $CO_2$ in Dissolved Inorganic Carbons of Water Samples from Various Origins Using Wavelength-Scanned Cavity Ring-Down Spectrophotometer. Geophysical Research Abstracts. 11. (abstract only).
Sadhwani et al., "Case Studies on environmental impact of seawater desalination" Science Direct; http://www.sciencedirect.com/science?_ob=ArticleURL&_udi=B6TFX-4HMX97J3&_u... 3pp.
Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.
Schwab, E. 2004. Calciumhydroxid, XP-002577920. Retrieved from the Internet: <URL:http://www.roempp.com/prod/indexl.html> (In German with English Translation).
Schouten, S., et al. 2004. Stable Carbon Isotopic Fractionations Associated with Inorganic Carbon Fixation by Anaerobic Ammonium-Oxidizing Bacteria. Applied and Environmental Microbiology. 70(6): 3785-3788.
Schroll, E. 2002. Genesis of magnesite deposits in the view of isotope geochemistry. Boletim Paranaense de Geociencias. 50: 59-68.
Sheppard, S.M.F., et al. 1970. Fractionation of Carbon and Oxygen Isotopes and Magnesium between Coexisting Metamorphic Calcite and Dolomite. Contr. Mineral. And Petrol. 26. 161-198.
Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.
Sethi, S. et al. 2006. Existing & Emerging Concentrate Minimization & Disposal Practices for Membrane Systems. Florida Water Resources Journal. pp. 38, 40, 42, 44, 46, 48.
Shell Global Solutions, 2003. "ADIP-X and Sulfmol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).

Sial, A.N., et al. 2000. Carbon isotope fluctuations in Precambrian carbonate sequences of several localities in Brazil. An. Acad. Bras. Ci. 72(4): 539-558.

Stanley, S.M., et al. 2002. Low-magnesium calcite produced by coralline algae in seawater of Late Cretaceous composition. PNAS. 99(24): 15323-15326.

Tececo Pty Ltd, "Eco-Cement"; www.tececo.com/simple.eco-cement.php; Dec. 29, 2008; 6pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/126,776, filed May 23, 2008, Constantz, Brent R., et al, Non-Final Office Action dated Feb. 25, 2010; 21 pp.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/163,205, filed Jun. 27, 2008, Constantz, Brent R., et al, Non-Final Office Action dated Mar. 25, 2010.

U.S. Appl. No. 12/344,019, filed Dec. 24, 2008, Constantz, Brent R., et al, Non-Final Office Action dated Nov. 16, 2009.

U.S. Appl. No. 12/344,019, filed Dec. 24, 2008, Constantz, Brent R., et al, Non-Final Office Action dated Mar. 11, 2010.

U.S. Appl. No. 12/375,632, filed Mar. 5, 2009, Kirk, Donald W. et al, Non-Final Office Action dated Mar. 19, 2010.

U.S. Appl. No. 12/375,632, filed Mar. 5, 2009, Kirk, Donald W. et al, Non-Final Office Action dated Sep. 8, 2009.

U.S. Appl. No. 12/475,378, filed May 29, 2009, Constantz Brent. et al, Final Office Action dated May 5, 2010.

U.S. Appl. No. 12/475,378, filed May 29, 2009, Constantz Brent. et al, Non-Final Office Action dated Mar. 17, 2010.

U.S. Appl. No. 12/475,378, filed May 29, 2009, Constantz Brent. et al, Non-Final Office Action dated Mar. 2, 2010.

U.S. Appl. No. 12/486,692, filed Jun. 17, 2009, Constantz Brent. et al, Final Office Action dated May 3, 2010.

U.S. Appl. No. 12/486,692, filed Jun. 17, 2009, Constantz Brent. et al, Non-Final Office Action dated Mar. 23, 2010.

U.S. Appl. No. 12/486,692, filed Jun. 17, 2009, Constantz Brent. et al, Non-Final Office Action dated Mar. 1, 2010.

U.S. Appl. No. 12/501,217, filed Jul. 10, 2009, Constantz Brent. et al, Non-Final Office Action dated Mar. 12, 2010.

U.S. Appl. No. 12/557,492, filed Sep. 10, 2009, Constantz, Brent R., et al. Non-Final Office Action dated May 6, 2010.

U.S. Appl. No. 12/604,383, filed Oct. 22 2009, Constantz Brent R. et al, Non-Final Office Action dated Apr. 5, 2010.

U.S. Appl. No. 12/604,383, filed Oct. 22 2009, Constantz Brent R. et al, Final Office Action dated Jun. 11, 2010.

U.S. Appl. No. 12/571,398, filed Sep. 30, 2009, Constantz Brent R. et al, Non-Final Office Action dated May 3, 2010.

U.S. Appl. No. 12/609,491, filed Oct. 30, 2009, Constantz Brent. et al, Non-Final Office Action dated Mar. 31, 2010.

Vagin, S.P., et al. 1979. Measurement of the Temperature of Gas Media Containing Carbon Dioxide by the Laser-Probing Method. Plenum.

Wang, W., et al. 2005. Effects of biodegradation on the carbon isotopic composition of natural gas—A case study in the bamianhe oil field of the Jiyang Depression, Eastern China. Geochemical Journal. 39(4): 301-309. (abstract) [online] [retrieved on Dec. 29, 2009] <URL: http://www/jstagejst.gojp/article/geochemj/39/4/39_301/_article> ab.

Webber, M.E., et al. 2001. In situ combustion measurements of CO2 by use of a distributed-feedback diode-laser sensor near 2.0 μm. Applied Optics. 40(6): 821-828.

Wen-Zhi et al., "Using Electrolytic Method to Promote CO2 Sequestration in Serpentine by Mineral Carbonation"; Journal of China University of Mining and Technology; vol. 36, No. 6; Nov. 2007 (Publication and English Translation).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. Society of Economic Geologists, Inc. 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONT0_06-88_0114.PDF>.

Wright, L.L., et al. 1993. "U.S. Carbon Offset Potential Using Biomass Energy Systems." Water, Air, and Soil Pollution. 70: 483-497.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

Metz. 2005. IPCC Special Report on Carbon Dioxide Capture and Storage. *Cambridge University*. p. 324 <http://books.google.com/books?id=HWgRvPUgyvQC&dq=serpentine+olivine+close+by+cement+plant&source=gbs_navlinks_s> viewed Jul. 15, 2011.

U.S. Appl. No. 12/163,205, filed Jun. 27, 2008, Constantz, Brent R., et al, Notice of Allowance dated May 18, 2010.

U.S. Appl. No. 12/700,129, filed Feb. 4, 2010, Constantz, Brent R., et al, Non-Final Office Action dated Oct. 20, 2010.

U.S. Appl. No. 12/700,129, filed Feb. 4, 2010, Constantz, Brent R., et al, Notice of Allowance dated Feb. 25, 2011.

U.S. Appl. No. 12/700,193, filed Feb. 4, 2010, Constantz, Brent R., et al, Non-Final Office Action dated Oct. 20, 2010.

U.S. Appl. No. 12/700,193, filed Feb. 4, 2010, Constantz, Brent R., et al, Final Office Action dated Feb. 23, 2011.

U.S. Appl. No. 12/344,019, filed Dec. 24, 2008, Constantz, Brent R., et al, Non-Final Office Action dated Jul. 14, 2010.

U.S. Appl. No. 12/344,019, filed Dec. 24, 2008, Constantz, Brent R., et al, Notice of Allowance dated Dec. 1, 2010.

U.S. Appl. No. 12/698,741, filed Feb. 2, 2010, Constantz, Brent R., et al, Non-Final Office Action dated Sep. 28, 2010.

U.S. Appl. No. 12/698,741, filed Feb. 2, 2010, Constantz, Brent R., et al, Final Office Action dated Mar. 9, 2011.

U.S. Appl. No. 12/698,802, filed Feb. 2, 2010, Constantz, Brent R., et al, Non-Final Office Action dated Sep. 29, 2010.

U.S. Appl. No. 12/698,802, filed Feb. 2, 2010, Constantz, Brent R., et al, Final Office Action dated Mar. 10, 2011.

U.S. Appl. No. 12/942,558, filed Nov. 9, 2010, Constantz, Brent R., et al, Non-Final Office Action dated Feb. 4, 2011.

U.S. Appl. No. 12/942,558, filed Nov. 9, 2010, Constantz, Brent R., et al, Final Office Action dated Jul. 22, 2011.

U.S. Appl. No. 12/698,483, filed Feb. 2, 2010, Constantz, Brent R., et al, Non-Final Office Action dated Sep. 28, 2010.

U.S. Appl. No. 12/698,483, filed Feb. 2, 2010, Constantz, Brent R., et al, Non-Final Office Action dated Dec. 15, 2010.

U.S. Appl. No. 12/698,483, filed Feb. 2, 2010, Constantz, Brent R., et al, Final Office Action dated Feb. 25, 2011.

U.S. Appl. No. 12/375,632, filed Mar. 5, 2009, Kirk, Donald W. et al, Notice of Allowance dated Jun. 28, 2010.

U.S. Appl. No. 12/475,378, filed May 29, 2009, Constantz Brent. et al, Notice of Allowance dated Jun. 3, 2010.

U.S. Appl. No. 12/794,198, filed Jun. 4, 2010, Constantz Brent et al, Non-Final Office Action dated Nov. 4, 2010.

U.S. Appl. No. 12/794,198, filed Jun. 4, 2010, Constantz Brent et al, Notice of Allowance dated Jan. 10, 2011.

U.S. Appl. No. 12/486,692, filed Jun. 17, 2009, Constantz Brent et al, Notice of Allowance dated May 24, 2010.

U.S. Appl. No. 12/501,217, filed Jul. 10, 2009, Constantz Brent et al, Notice of Allowance dated May 25, 2010.

U.S. Appl. No. 12/788,255, filed May 26, 2010, Constantz Brent, R. et al, Non-Final Office Action dated Dec. 10, 2010.
U.S. Appl. No. 12/788,255, filed May 26, 2010, Constantz Brent, R. et al, Final Office Action dated May 18, 2011.
U.S. Appl. No. 12/557,492, filed Sep. 10, 2009, Constantz, Brent R., et al. Final Office Action dated Sep. 16, 2010.
U.S. Appl. No. 12/557,492, filed Sep. 10, 2009, Constantz, Brent R., et al. Notice of Allowance dated Feb. 22, 2011.
U.S. Appl. No. 12/604,383, filed Oct. 22 2009, Constantz Brent R. et al, Notice of Allowance dated Sep. 20, 2010.
U.S. Appl. No. 12/571,398, filed Sep. 30, 2009, Constantz Brent R. et al, Notice of Allowance dated Jun. 18, 2010.
U.S. Appl. No. 12/826,209, filed Jun. 29, 2010, Constantz Brent R. et al, Non-Final Office Action dated Nov. 5, 2010.
U.S. Appl. No. 12/826,209, filed Jun. 29, 2010, Constantz Brent R. et al, Non-Final Office Action dated Mar. 16, 2011.
U.S. Appl. No. 12/826,209, filed Jun. 29, 2010, Constantz Brent R. et al, Notice of Allowance dated Jul. 15, 2011.
U.S. Appl. No. 12/609,491, filed Oct. 30, 2009, Constantz Brent. et al, Final Office Action dated Jul. 16, 2010.
U.S. Appl. No. 12/609,491, filed Oct. 30, 2009, Constantz Brent. et al, Notice of Allowance dated Sep. 29, 2010.
U.S. Appl. No. 12/790,317, filed May 28, 2010, Constantz Brent. et al, Non-Final Office Action dated Aug. 17, 2010.
U.S. Appl. No. 12/790,317, filed May 28, 2010, Constantz Brent. et al, Final Office Action dated Feb. 16, 2011.
U.S. Appl. No. 12/721,549, filed Mar. 10, 2010, Farsad Kasra et al, Non-Final Office Action dated Feb. 17, 2011.
U.S. Appl. No. 12/721,545, filed Mar. 10, 2010, Farsad Kasra et al, Non-Final Office Action dated Feb. 14, 2011.
U.S. Appl. No. 12/716,235, filed Mar. 2, 2010, Seeker, William Randall et al, Non-Final Office Action dated Mar. 4, 2011.
U.S. Appl. No. 12/571,400, filed Sep. 30, 2009, Constantz, Brent. et al, Office Action dated Jul. 26, 2010.
U.S. Appl. No. 12/571,400, filed Sep. 30, 2009, Constantz, Brent. et al, Final Office Action dated Nov. 2, 2010.
U.S. Appl. No. 12/571,400, filed Sep. 30, 2009, Constantz, Brent. et al, Notice of Allowance dated Mar. 28, 2011.
U.S. Appl. No. 12/521,256, filed Mar. 5, 2010, Gilliam, Ryan et al, Office Action dated Jul. 28, 2010.
U.S. Appl. No. 12/521,256, filed Mar. 5, 2010, Gilliam, Ryan et al, Notice of Allowance dated Nov. 30, 2010.
U.S. Appl. No. 12/503,557, filed Jul. 15, 2009, Gilliam, Ryan J. et al, Non-Final Office Action dated Nov. 24, 2010.
U.S. Appl. No. 12/503,557, filed Jul. 15, 2009, Gilliam, Ryan J. et al, Final Office Action dated Apr. 21, 2011.
U.S. Appl. No. 12/541,055, filed Aug. 13, 2009, Gilliam, Ryan J. et al, Office Action dated Jul. 22, 2010.
U.S. Appl. No. 12/541,055, filed Aug. 13, 2009, Gilliam, Ryan J. et al, Non-Final Office Action dated Nov. 12, 2010.
U.S. Appl. No. 12/541,055, filed Aug. 13, 2009, Gilliam, Ryan J. et al, Notice of Allowance dated Jun. 23, 2011.
U.S. Appl. No. 12/617,005, filed Nov. 12, 2009, Gilliam, Ryan J. et al, Office Action dated Oct. 5, 2010.
U.S. Appl. No. 12/617,005, filed Nov. 12, 2009, Gilliam, Ryan J. et al, Notice of Allowance dated Mar. 18, 2011.
Various authors. 2001. "Calcium Carbonate: From the Cretaceous Period Into the 21st Century." *Birkhauser Verlag*, pp. 1-54. <http://books.google.com/books?id=pbkKGal9k5QC&Ipg=PA15&ots=gjUthWmGIR&dq=vater ite%20limestone &pg=PA54#v=twopage&q&f=true> viewed Jul. 14, 2011.
Jones. 1996. Principles and Prevention of Corrosion. Second Edition. Lebanon, Indiana: Prentice Hall. pp. 50-52.

* cited by examiner

$CO_2$-SEQUESTERING FORMED BUILDING MATERIALS

CROSS-REFERENCE

This application is a divisional of U.S. patent application Ser. No. 12/826,209, filed 29 Jun. 2010, now U.S. Pat. No. 8,006,446, which, in turn, is a continuation of U.S. patent application Ser. No. 12/571,398, filed 30 Sep. 2009, now U.S. Pat. No. 7,771,684, which claims the benefit of U.S. Provisional Patent Application No. 61/110,489, filed 31 Oct. 2008, titled "$CO_2$-Sequestering Formed Building Materials"; U.S. Provisional Patent Application No. 61/149,610, filed 3 Feb. 2009, titled "$CO_2$-Sequestering Formed Building Materials"; U.S. Provisional Patent Application No. 61/246,042, filed 25 Sep. 2009, titled "$CO_2$-Sequestering Formed Building Materials"; and U.S. Provisional Patent Application No. 61/101,631, filed 30 Sep. 2008, titled "$CO_2$ Sequestration," each of which is incorporated herein by reference.

BACKGROUND

Carbon dioxide ($CO_2$) emissions have been identified as a major contributor to the phenomenon of global warming and ocean acidification. $CO_2$ is a by-product of combustion and it creates operational, economic, and environmental problems. It is expected that elevated atmospheric concentrations of $CO_2$ and other greenhouse gases will facilitate greater storage of heat within the atmosphere leading to enhanced surface temperatures and rapid climate change. $CO_2$ has also been interacting with the oceans driving down the pH toward 8.0. $CO_2$ monitoring has shown atmospheric $CO_2$ has risen from approximately 280 parts per million (ppm) in the 1950s to approximately 380 ppm today, and is expect to exceed 400 ppm in the next decade. The impact of climate change will likely be economically expensive and environmentally hazardous. Reducing potential risks of climate change will require sequestration of $CO_2$.

SUMMARY

In some embodiments, the invention provides a method for producing a formed building material comprising producing a $CO_2$-sequestering component from divalent cations and a gaseous waste stream comprising $CO_2$, and forming a building material comprising the $CO_2$-sequestering component, wherein the formed building material comprises 5% to 90% (w/w) $CO_2$-sequestering component. In some embodiments, the formed building material comprises 5% to 75% (w/w) $CO_2$-sequestering component. In some embodiments, the formed building material comprises 5% to 50% (w/w) $CO_2$-sequestering component. In some embodiments, the formed building material comprises 5% to 50% (w/w) $CO_2$-sequestering component. The $CO_2$-sequestering component of the formed building material comprises carbonates. In some embodiments, the gaseous waste stream further comprises NOx, SOx, VOCs, particulates, mercury, or a combination thereof. As such, in some embodiments the $CO_2$-sequestering component further comprises co-products of NOx, SOx, VOCs, particulates, mercury, or a combination thereof resulting from conditions used to convert carbon dioxide to carbonates. In some embodiments, the formed building material has a carbon footprint that is neutral or negative. In some embodiments, the formed building material has a carbon footprint that is neutral. In some embodiments, the formed building material has a carbon footprint that is negative. Water for forming the formed building material may be provided by the $CO_2$-sequestering component. In some embodiments, the $CO_2$-sequestering component provides at least 50% of the water for forming the formed building material. Due to the high albedo of the formed building material, the formed building material may continuously reduce carbon emission via reduced lighting demands.

In some embodiments, the invention also provides a formed building material produced by any of the preceding methods. In some embodiments, the formed building material is a brick, a block, a tile, a cement board, a conduit, a beam, a basin, a column, drywall, fiber-cement siding, a slab, an acoustic barrier, or insulation.

In some embodiments, the invention also provides a formed building material comprising a $CO_2$-sequestering component, wherein the formed building material comprises 5% to 90% (w/w) $CO_2$-sequestering component. In some embodiments, the formed building material comprises 5% to 75% (w/w) $CO_2$-sequestering component. In some embodiments, the formed building material comprises 5% to 50% (w/w) $CO_2$-sequestering component. In some embodiments, the formed building material comprises 5% to 50% (w/w) $CO_2$-sequestering component. The $CO_2$-sequestering component of the building material comprises carbonates. In some embodiments, the $CO_2$-sequestering component further comprises carbonate co-products from NOx, SOx, VOCs, particulates, mercury, or a combination thereof. In some embodiments, the $CO_2$-sequestering component further comprises co-products from SOx. In some embodiments, the $CO_2$-sequestering component further comprises co-products from mercury. The formed building material may be a brick, a block, a tile, a cement board, a conduit, a beam, a basin, a column, drywall, fiber-cement siding, a slab, an acoustic barrier, or insulation. In some embodiments, the formed building material is a brick or block. In some embodiments, the brick or block has a compressive strength of 5 to 100 MPa. In some embodiments, the formed building material is a tile. In some embodiments, the tile has a compressive strength of 5 to 75 MPa. In some embodiments, the formed building material is a slab. In some embodiments, the slab has a compressive strength of 10 to 100 MPa.

In some embodiments, the invention also provides a formed building material comprising a $CO_2$-sequestering component. In some embodiments, the $CO_2$-sequestering component is a carbonate compound composition. In some embodiments, the carbonate compound composition comprises a precipitation material from an alkaline earth metal-containing water. In some embodiments, the alkaline earth metal-containing water comprises $CO_2$ derived from an industrial waste stream. In some embodiments, the $CO_2$-sequestering component is a cementitious component. In some embodiments, the formed building material is a brick, a board, a conduit, a beam, a basin, a column, drywall, a tile, fiber siding, a slab, an acoustic barrier, or insulation.

In some embodiments, the invention also provides a method of producing a formed building material, the method comprising obtaining a $CO_2$-sequestering component and producing a formed building material comprising the $CO_2$-sequestering component. In some embodiments, the $CO_2$-sequestering component is a carbonate compound composition. In some embodiments, the carbonate compound composition comprises a precipitation material from an alkaline earth metal-containing water. In some embodiments, the alkaline earth metal-containing water comprises $CO_2$ derived from an industrial waste stream. In some embodiments, the $CO_2$-sequestering component is a cementitious component. In some embodiments, the formed building material is a brick, a board, a conduit, a beam, a basin, a column, drywall, a tile, fiber siding, a slab, an acoustic barrier, or insulation.

In some embodiments, the invention also provides a method of fabricating a built structure, the method comprising employing a formed building material comprising a $CO_2$-sequestering component. In some embodiments, the $CO_2$-sequestering component is a carbonate compound composition. In some embodiments, the carbonate compound composition comprises a precipitation material from an alkaline earth metal-containing water. In some embodiments, the alkaline earth metal-containing water comprises $CO_2$ derived from an industrial waste stream. In some embodiments, the $CO_2$-sequestering component is a cementitious component. In some embodiments, the formed building material is a brick, a board, a conduit, a beam, a basin, a column, drywall, a tile, fiber siding, a slab, an acoustic barrier, or insulation.

In some embodiments, the invention also provides a method of sequestering carbon dioxide, the method comprising precipitating a $CO_2$-sequestering carbonate compound composition from an alkaline earth metal-containing water and fabricating a formed building material comprising the $CO_2$-sequestering carbonate compound composition. In some embodiments, the alkaline earth metal-containing water is contacted to an industrial waste stream prior to the precipitating step.

DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

FIG. 1 provides a schematic of a $CO_2$-sequestering component production process according to an embodiment of the invention.

Figure 2:
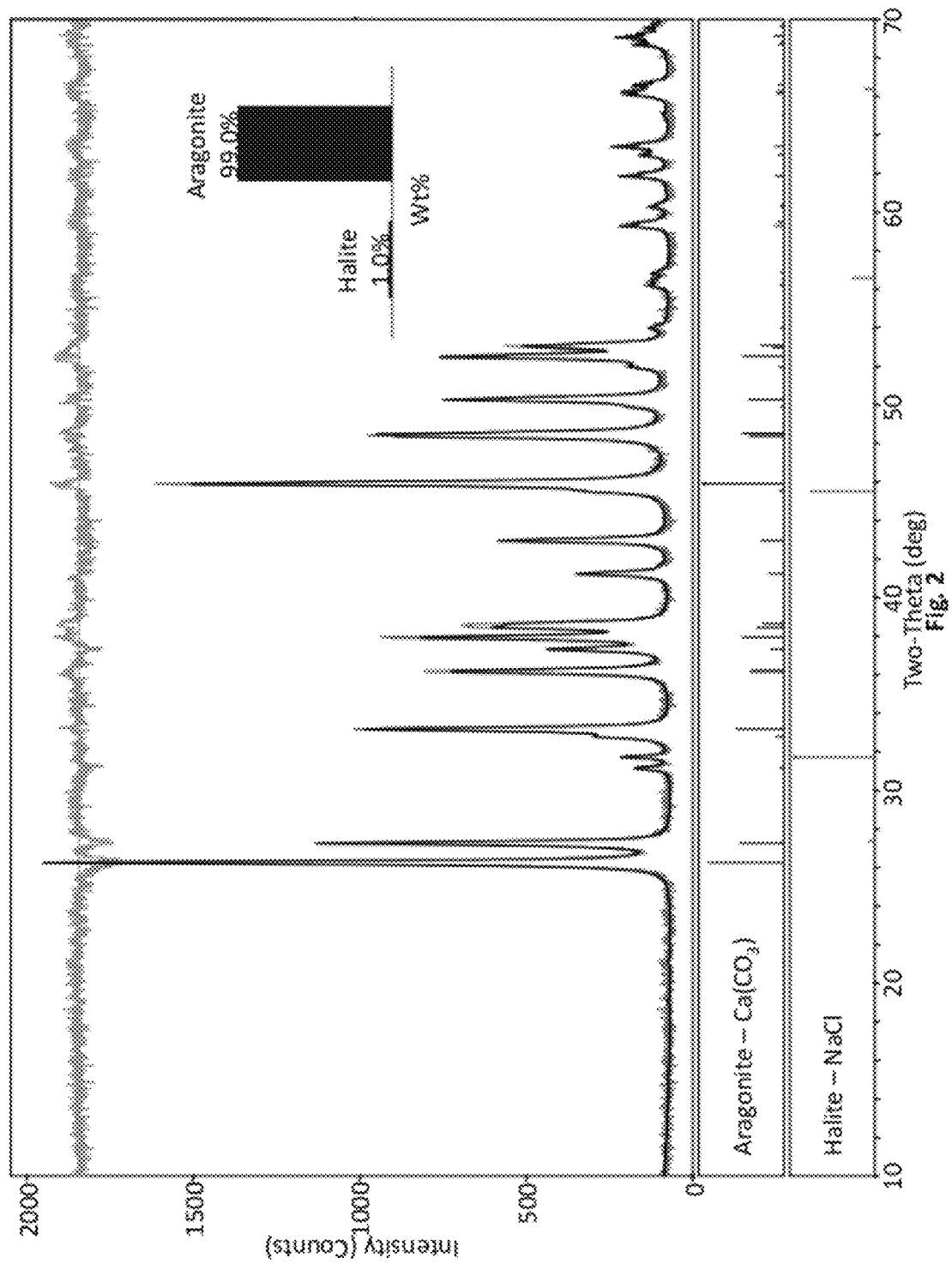

FIG. 2 provides an X-ray diffraction ("XRD") spectrum for precipitation material produced in Example 1.

Figure 3:
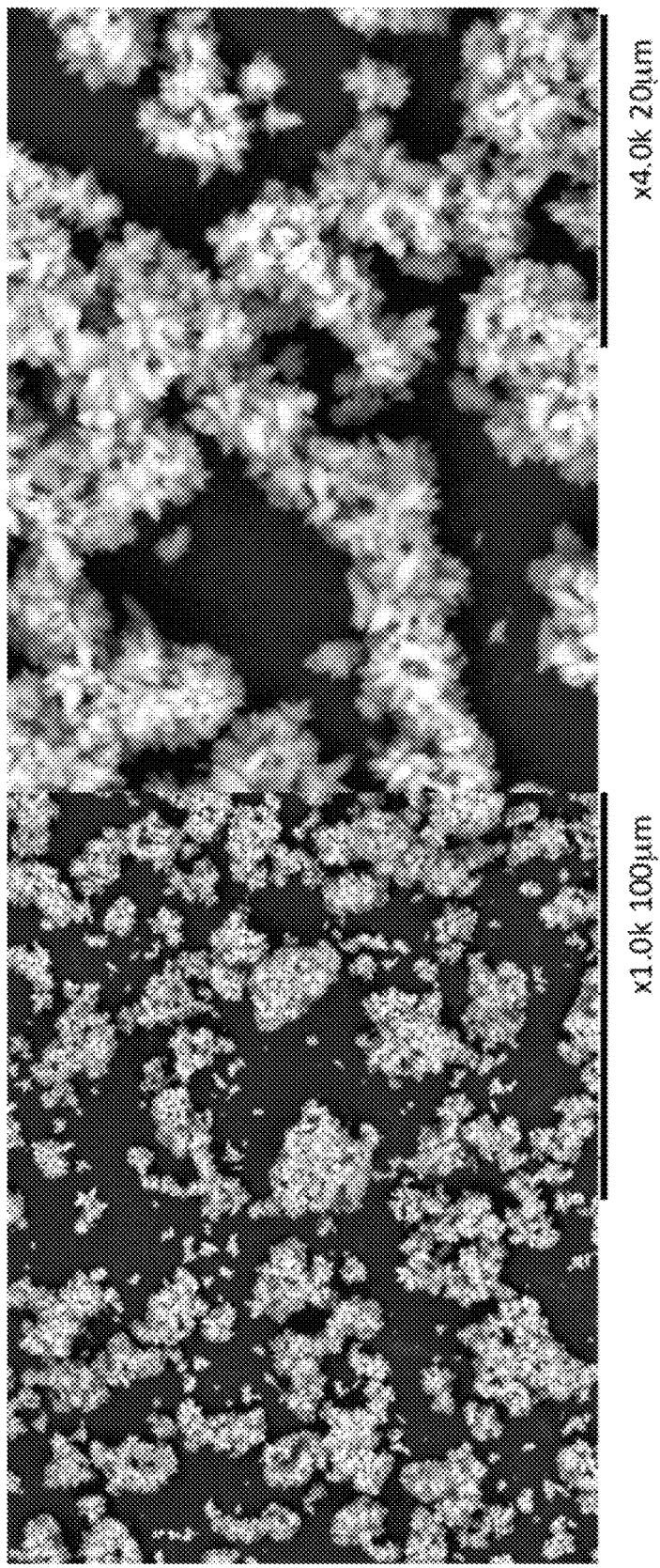

FIG. 3 provides scanning electron microscope ("SEM") images of the precipitation material produced in Example 1.

DESCRIPTION $CO_2$-sequestering formed building materials are provided. The building materials of the invention include a component (e.g., a $CO_2$-sequestering component), which comprises carbonates, bicarbonates, or a combination thereof. Additional aspects of the invention include methods of making and using the $CO_2$-sequestering formed building materials.

Before the invention is described in greater detail, it is to be understood that the invention is not limited to particular embodiments described herein as such embodiments may vary. It is also to be understood that the terminology used herein is for the purpose of describing particular embodiments only, and is not intended to be limiting, since the scope of the invention will be limited only by the appended claims. Unless defined otherwise, all technical and scientific terms used herein have the same meaning as commonly understood by one of ordinary skill in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible. Although any methods and materials similar or equivalent to those described herein may also be used in the practice or testing of the invention, representative illustrative methods and materials are now described.

CO2-Sequestering Formed Building Materials

In some embodiments, the invention provides $CO_2$-sequestering formed building materials, which formed building materials comprise carbon derived from a fuel used by humans, e.g., carbon having a fossil fuel origin. For example, $CO_2$-sequestering formed building materials according to aspects of the invention contain carbon that was released in the form of $CO_2$ from the combustion of fuel. In certain embodiments, the carbon sequestered in a composition of the invention (e.g., $CO_2$-sequestering composition) is in the form of a carbonate compound. Therefore, in certain embodiments, $CO_2$-sequestering formed building materials according to aspects of the subject invention contain carbonate compounds where at least part of the carbon in the carbonate compounds is derived from a fuel used by humans, e.g., a fossil fuel. As such, production of formed building materials of the invention results in the placement of $CO_2$ into a storage stable form, e.g., a component of the built environment, i.e., a man-made structure, such as a building, wall, road, etc. As such, production of the $CO_2$-sequestering formed building materials of the invention results in the prevention of $CO_2$ gas from entering the atmosphere.

Building materials of the invention include a carbonate/bicarbonate component (e.g., $CO_2$-sequestering component). Such components store a significant amount of $CO_2$ in a storage-stable format, such that $CO_2$ gas is not readily produced from the product and released into the atmosphere. In certain embodiments, the carbonate/bicarbonate components (e.g., $CO_2$-sequestering components) can store 50 tons or more of $CO_2$, such as 100 tons or more of $CO_2$, including 250 tons or more of $CO_2$, for instance 500 tons or more of $CO_2$, such as 750 tons or more of $CO_2$, including 900 tons or more of $CO_2$ for every 1000 tons of building material of the invention. In certain embodiments, the carbonate/bicarbonate components (e.g., $CO_2$-sequestering components) of the building materials comprise about 5% or more of $CO_2$, such as about 10% or more of $CO_2$, including about 25% or more of $CO_2$, for instance about 50% or more of $CO_2$, such as about 75% or more of $CO_2$, including about 90% or more of $CO_2$, e.g., present as one or more carbonate compounds.

The carbonate/bicarbonate components (e.g., $CO_2$-sequestering components) of the invention may include one or more carbonate compounds. The amount of carbonate in the carbonate/bicarbonate component (e.g., $CO_2$-sequestering component), as determined by, for example, coulometry using the protocol described in coulometric titration, is 40% or higher, such as 70% or higher, including 80% or higher. In some embodiments, where the Mg source is a mafic mineral (described in U.S. patent application Ser. No. 12/501,217, filed 10 Jul. 2009, and U.S. Provisional Patent Application No. 61/079,790, filed 10 Jul. 2008, each of which is incorporated herein by reference) or an ash (described in U.S. application Ser. No. 12/486,692, filed 17 Jun. 2009, and U.S. Provisional Application Ser. No. 61/073,319, filed 17 Jun. 2008, each of which is incorporated herein by reference), the resultant product may be a composition containing silica as well as carbonate. In these embodiments, the carbonate content of the product may be as low as 10%.

The building materials of the invention provide for long-term storage of $CO_2$ in a manner such that $CO_2$ is sequestered (i.e., fixed) in the building material, where the sequestered $CO_2$ does not become part of the atmosphere. When the building material is maintained under conditions conventional for its intended use, the building material keeps sequestered $CO_2$ fixed for extended periods of time (e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer) without significant, if any, release of the $CO_2$ from the building material. With respect to the $CO_2$-sequestering building materials, when they are employed in their intended use and over their lifetime, the amount of degradation, if any, as measured in terms of $CO_2$ gas release from the product will not exceed 5% per year, and in certain embodiments will not exceed 1% per year. Indeed, $CO_2$-sequestering building materials provided by the invention do not release more than 1%, 5%, or 10% of its total $CO_2$ when exposed to normal conditions of temperature and moisture, including rainfall of normal pH, for its intended use, for at least 1, 2, 5, 10, or 20 years, or for more than 20 years, for example, for more than 100 years. In some embodiments the composition does not release more than 1% of its total $CO_2$ when exposed to normal conditions of temperature and moisture, including rainfall of normal pH, for its intended use, for at least 1 year. In some embodiments the composition does not release more than 5% of its total $CO_2$ when exposed to normal conditions of temperature and moisture, including rainfall of normal pH, for its intended use, for at least 1 year. In some embodiments the composition does not release more than 10% of its total $CO_2$ when exposed to normal conditions of temperature and moisture, including rainfall of normal pH, for its intended use, for at least 1 year. In some embodiments the composition does not release more than 1% of its total $CO_2$ when exposed to normal conditions of temperature and moisture, including rainfall of normal pH, for its intended use, for at least 10 years. In some embodiments the composition does not release more than 1% of its total $CO_2$ when exposed to normal conditions of temperature and moisture, including rainfall of normal pH, for its intended use, for at least 100 years. In some embodiments the composition does not release more than 1% of its total $CO_2$ when exposed to normal conditions of temperature and moisture, including rainfall of normal pH, for its intended use, for at least 1000 years.

Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of materials of the invention for a given period (e.g., 1, 10, 100, 1000, or more than 1000 years).

$CO_2$ content of the material may be monitored by any suitable method (e.g., coulometry). Other conditions may be adjusted as appropriate, including pH, pressure, UV radiation, and the like, again depending on the intended or likely environment. It will be appreciated that any suitable conditions may be used that one of skill in the art would reasonably conclude indicate the requisite stability over the indicated time period. In addition, if accepted chemical knowledge indicates that the composition would have the requisite stability for the indicated period this may be used as well, in addition to or in place of actual measurements. For example, some carbonate compounds that may be part of a composition of the invention (e.g., in a given polymorphic form) may be well-known geologically and known to have withstood normal weather for decades, centuries, or even millennia, without appreciable breakdown, and so have the requisite stability.

The carbonate compounds of the $CO_2$-sequestering components are metastable carbonate compounds that are precipitated from a solution of divalent cations, such as a saltwater, as described in greater detail below. The carbonate compound compositions of the invention include precipitated crystalline and/or amorphous carbonate compounds. Specific carbonate minerals of interest include, but are not limited to: calcium carbonate minerals, magnesium carbonate minerals, and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3.6H_2O$), and amorphous calcium carbonate ($CaCO_3.nH_2O$). Magnesium carbonate minerals of interest include, but are not limited to: magnesite ($MgCO_3$), barringtonite ($MgCO_3.2H_2O$), nesquehonite ($MgCO_3.3H_2O$), lanfordite ($MgCO_3 \cdot 5H_2O$), and amorphous magnesium calcium carbonate ($MgCO_3 \cdot nH_2O$). Calcium magnesium carbonate minerals of interest include, but are not limited to dolomite ($CaMgCO_3$), huntite ($CaMg_3(CO_3)_4$), and sergeevite ($Ca_2Mg_{11}(CO_3)_{13} \cdot H_2O$). In certain embodiments, non-carbonate compounds like brucite ($Mg(OH)_2$) may also form in combination with the minerals listed above. As indicated above, the compounds of the carbonate compound compositions are metastable carbonate compounds (and may include one or more metastable hydroxide compounds) that are more stable in saltwater than in freshwater, such that upon contact with fresh water of any pH they dissolve and re-precipitate into other fresh water stable compounds, e.g., minerals such as low-Mg calcite.

The carbonate/bicarbonate components (e.g., $CO_2$-sequestering components) of the invention are derived from, e.g., precipitated from, an aqueous solution of divalent cations (as described in greater detail below). As the carbonate/bicarbonate components (e.g., $CO_2$-sequestering components) are precipitated from water, they will include one or more components that are present in the water from which they are derived. For example, where the aqueous solution of divalent cations is saltwater, the $CO_2$-sequestering product (e.g., precipitation material) will include one or more compounds found in the saltwater source. These compounds identify the solid precipitations of the compositions that come from the saltwater source, where these identifying components and the amounts thereof are collectively referred to herein as a saltwater source identifier. For example, if the saltwater source is seawater, identifying compounds that may be present in precipitation material include, but are not limited to: chloride, sodium, sulfur, potassium, bromide, silicon, strontium, and the like. Any such source-identifying or "marker" elements are generally present in small amounts, e.g., in amounts of 20,000 ppm or less, such as amounts of 2000 ppm or less. In certain embodiments, the "marker" compound is strontium, which may be incorporated into, for example, an aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. Also of interest are isotopic markers that identify the water source.

Depending on the particular building material or product, the amount of carbonate/bicarbonate component (e.g., $CO_2$-sequestering component) that is present in the building material may vary. In some instances, the amount of the carbonate/bicarbonate component (e.g., $CO_2$-sequestering component) in the building material ranges from 5 to 100% (w/w), such as 5 to 90% (w/w), including 5 to 75% (w/w), 5 to 50% (w/w), 5 to 25% (w/w), and 5 to 10% (w/w).

The building materials of the invention may be viewed as low-carbon footprint building materials. Low-carbon footprint building materials have a reduced carbon footprint as compared to corresponding building materials that lack the carbonate/bicarbonate component (e.g., $CO_2$-sequestering component). Using any convenient carbon footprint calculator, the magnitude of carbon footprint reduction of the building materials of the invention as compared to corresponding building materials that lack the carbonate/bicarbonate component (e.g., $CO_2$-sequestering component) may be 5% or more, such as 10% or more, including 25%, 50%, 75% or even 100% or more. In certain embodiments, the low-carbon footprint building materials of the invention are carbon neutral, in that they have substantially no, if any, calculated carbon footprint, e.g., as determined using any convenient carbon footprint calculator that is relevant for a particular building material of interest. Carbon neutral building materials of the invention include those compositions that exhibit a carbon footprint of 50 lbs $CO_2$/cu yd material or less, such as 10 lbs $CO_2$/cu yd material or less, including 5 lbs $CO_2$/cu yd material or less, where in certain embodiments the carbon neutral materials have 0 or negative lbs $CO_2$/cu yd material, such as negative 1 or more, e.g., negative 3 or more lbs $CO_2$/cu yd material. In come instances, the low carbon footprint materials have a significantly negative carbon footprint, e.g., −100 or more lbs $CO_2$/cu yd or less.

$CO_2$-sequestering components (i.e., precipitation material comprising carbonates, bicarbonates, or a combination thereof) of the invention comprise $CO_2$ that otherwise would have been released into the atmosphere, most of which results from burning fossil fuels, which fuels are of plant origin. As such, $CO_2$-sequestering components of the invention, which comprise one or more synthetic carbonates derived from industrial $CO_2$, reflect the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mille) is a measure of the ratio of the concentration of two stable isotopes of carbon, namely $^{12}C$ and $^{13}C$, relative to a standard of fossilized belemnite (the PDB standard).

$$\delta^{13}C‰=[(^{13}C/^{12}C_{sample}-^{13}C/^{12}C_{PDB\ standard})/(^{13}C/^{12}C_{PDB\ standard})]\times 1000$$

As such, the $\delta^{13}C$ value of the synthetic carbonate-containing precipitation material (e.g., $CO_2$-sequestering component) serves as a fingerprint for a $CO_2$ gas source, especially $CO_2$ released from burning fossil fuel. The $\delta^{13}C$ value may vary from source to source (i.e., fossil fuel source), but the $\delta^{13}C$ value for carbonate/bicarbonate components (e.g., $CO_2$-sequestering components) of the invention generally, but not necessarily, ranges between −9‰ to −35‰. In some embodiments, the $\delta^{13}C$ value for the synthetic carbonate-containing precipitation material is between −1‰ and −50‰, between −5‰ and −40‰, between −5‰ and −35‰, between −7‰ and −40‰, between −7‰ and −35‰, between −9‰ and −40‰, or between −9‰ and −35‰. In some embodiments, the $\delta^{13}C$ value for the synthetic carbonate-containing precipitation material is less than (i.e., more negative than)−3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰, wherein the more negative the $\delta^{13}C$ value, the more rich the synthetic carbonate-containing precipitation material is in $^{12}C$. Any suitable method may be used for measuring the $\delta^{13}C$ value, methods including, but not limited to, mass spectrometry or off-axis integrated-cavity output spectroscopy (off-axis ICOS).

In some embodiments, the invention provides a formed building material such as a roadway material, a brick, a block, a board (e.g., cement board), a conduit, a beam, a basin, a column, a tile, a fiber-siding product (e.g., fiber-cement siding), a slab, an acoustic barrier, dry-wall, or insulation or combinations thereof containing a component comprising carbonates or bicarbonates or combinations thereof where the carbon in the carbonates or bicarbonates has a $\delta^{13}C$ value less than −5‰. In some embodiments, the $\delta^{13}C$ value for the formed building material is between −1‰ and −50‰, between −5‰ and −40‰, between −5‰ and −35‰, between −7‰ and −40‰, between −7‰ and −35‰, between −9‰ and −40‰, or between −9‰ and −35‰. In some embodiments, the $\delta^{13}C$ value for the formed building material is less than (i.e., more negative than)−3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰, wherein the more negative the $\delta^{13}C$ value, the more rich the synthetic carbonate-containing composition is in $^{12}C$.

The formed building materials of the invention may vary greatly, which formed building materials comprise materials shaped (e.g., molded, cast, cut, or otherwise produced) into man-made structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials of the invention are also distinct from irregularly or imprecisely formed materials (e.g., aggregate, bulk forms for disposal, etc.) in that formed building materials are produced according to specifications that allow for use of formed building materials in, for example, buildings. Formed building materials of the invention may be prepared in accordance with traditional manufacturing protocols for such structures, with the exception that an amount of carbonate/bicarbonate component (e.g., $CO_2$-sequestering component) of the invention is employed. The portion of components replaced with the carbonate/bicarbonate component (e.g., $CO_2$-sequestering component) may vary, and in certain instances is 5% by weight or more, including 10% by weight or more, 25% by weight or more, 50% by weight or more, 75% by weight or more, 90% by weight or more, or even 100% by weight. In producing the formed building materials, an amount of the carbonate/bicarbonate component (e.g., $CO_2$-sequestering component) may be combined with water and other additional components, which may include, but are not limited to clay, shale, soft slate, calcium silicate, quarried stone, Portland cement, fly ash, slag cement, aggregate (e.g., blast furnace slag, bottom ash, gravel, limestone, granite, sand, etc.), silica fume and pozzolans. Illustrative formed building materials according to certain embodiments of the invention are reviewed in greater detail below. However, the below review of formed building materials is not limiting on the invention, and is provided solely to further describe various exemplary embodiments of $CO_2$-sequestering formed building materials.

Masonry units are formed building materials used in the construction of load-bearing and non-load-bearing structures that are generally assembled using mortar, grout, and the like. Exemplary masonry units of the invention include bricks, blocks, and tiles. Bricks and blocks of the invention are polygonal structures possessing linear dimensions. Bricks of the invention are masonry units with dimensions (mm) not exceeding 337.5×225×112.5 (length×width×height). Any unit with dimensions (mm) between 337.5×225×112.5 to 2000×1000×500 (length×width×depth) is termed a "block." Structural units with dimensions (mm) exceeding 2000×1000×500 (length×width×depth) are termed "slabs." Tiles refer to masonry units that possess the same dimensions as bricks or blocks, but may vary considerably in shape, i.e., may not be polygonal (e.g., hacienda-style roof tiles).

One type of masonry unit provided by the invention is a brick, which refers to a structural unit of material used in masonry construction, generally laid using mortar. Bricks of the invention are masonry units with dimensions (mm) not exceeding 337.5×225×112.5 (length×width×height). In some embodiments, the bricks may have lengths ranging from 175 to 300 mm, such as 200 to 250 mm, including 200 to 230 mm; widths ranging from 75 to 150 mm, such as 100 to 120 mm, including 100 to 110 mm; and heights ranging from 50 to 90 mm, such as 50 to 80 mm, including 55 to 75 mm. Bricks of the invention may vary in grade, class, color, texture, size, weight and can be solid, cellular, perforated, frogged, or hollow. Bricks of the invention may include but are not limited to building brick, facing brick, load bearing brick, engineering brick, thin veneer brick, paving brick, glazed brick, firebox brick, chemical resistant brick, sewer and manhole brick, industrial floor brick, etc. The bricks may also vary in frost resistance (i.e., frost resistant, moderately frost resistant or non frost resistant), which relates to the durability of bricks in conditions where exposure to water may result in different levels of freezing and thawing. Frost resistant bricks are durable in conditions of constant exposure to water and freezing and thawing. Moderately frost resistant bricks are durable in conditions of sporadic exposure to water and freezing and thawing. Non-frost resistant bricks are not durable in conditions of exposure to water and freezing and thawing. These bricks are suitable only for internal use and are liable to damage by freezing and thawing except when protected by an impermeable cladding during construction. Bricks of the invention may also vary in soluble salt content (i.e., low or normal). Percentage by mass of soluble ions in bricks with a low soluble salt content does not exceed 0.03% magnesium, 0.03% potassium, 0.03% sodium, and 0.5% sulfate. Percentage by mass of soluble ions in bricks with a normal salt content does not exceed 0.25% of magnesium, potassium, and sodium in total and sulfate content does not exceed 1.6%. The bricks of the invention may vary considerably in physical and mechanical properties. The compressive strength of bricks of the invention may range, in certain instances, from 5 to 100 megapascals (MPa), including 20-40 MPa. The flexural strength of bricks of the invention may vary, ranging from 0.5 to 10 MPa, including 2 to 7 MPa, such as 2 to 5 MPa. The maximum water absorption of bricks of the invention may vary, ranging from 5 to 25%, including 10 to 15%. Bricks of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.2%, including 0.05 to 0.1%. In some embodiments, the bricks of the invention may be used for paving a road. Bricks used to pave areas exposed to heavy traffic (e.g., pedestrian, vehicular, etc.) may have an abrasion resistance index ranging from 0.1 to 0.5, including 0.2 to 0.4, such as 0.3. In addition, bricks of the invention may have a volume abrasion loss ranging from 1.0 to 4.0 $cm^3/cm^2$, including 1.5 to 2.5 $cm^3/cm^2$, such as 2.0 $cm^3/cm^2$. The $CO_2$-sequestering building material composition of the invention may be molded, extruded, or sculpted into the desired shape and size to form a brick. The shaped composition is then dried and further hardened by hydraulic pressure, autoclave or fired in a kiln at temperatures ranging between 900° to 1200° C., such as 900° to 1100° C. and including 1000° C.

Another type of masonry unit provided by the invention is blocks, (e.g., concrete, cement, foundation, etc.). Blocks are distinct from bricks based on their structural dimensions. Specifically, blocks exceed the dimensions (mm) of 337.5×

225×112.5 (length×width×height). Blocks of the invention may vary in color, texture, size, and weight and can be solid, cellular, and hollow or employ insulation (e.g., expanded polystyrene foam) in the block void volume. Blocks of the invention may be load-bearing, non-load-bearing or veneer (i.e., decorative) blocks. In some embodiments, the blocks may have lengths ranging from 300 to 500 mm, such as 350 to 450 mm, widths ranging from 150 to 250 mm, such as 180 to 215 mm and heights ranging from 100 to 250 mm, such as 150 to 200 mm. The blocks of the invention may also vary in faceshell thickness. In some instances, the blocks may have faceshell thicknesses ranging from 15 to 40 mm, including 20 to 30 mm, such as 25 mm. The blocks may also vary in web thickness. In some embodiments, the blocks may have web thicknesses ranging from 15 to 30 mm, including 15 to 25 mm, such as 20 mm. The blocks of the invention may vary considerably in physical and mechanical properties. The compressive strength of blocks of the invention may vary, in certain instances ranging from 5 to 100 MPa, including 15 to 75 MPa, such as 20 to 40 MPa. The flexural strength of blocks of the invention may also vary, ranging from 0.5 to 15 MPa, including 2 to 10 MPa, such as 4 to 6 MPa. The maximum water absorption of the blocks of the invention may vary, ranging from 7 to 20% by weight including 8 to 15%, such as 9 to 11%. Blocks of the invention may also undergo moisture movement (expansion or contraction) due to the absorption or loss of water to its environment. Blocks of the invention may be Type I moisture-controlled units or Type II non-moisture-controlled units. The dimensional stability (i.e., linear shrinkage) of the blocks of the invention may vary depending on their intended use and/or geographical location of use, in certain instances ranging from 0.02 to 0.15%, such as 0.03 to 0.05%. The $CO_2$-sequestering building material composition of the invention may be molded, extruded, or sculpted into the desired shape and size to form a block. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight concrete block. The composition is further cured in an environment with a controlled temperature and humidity.

Another type of building material provided by the invention is a tile. Tiles of the invention refer to non-load-bearing building materials that are commonly employed on roofs and to pave exterior and interior floors of commercial and residential structures. Some examples where tiles of the invention may be employed include, but are not limited to, the roofs of commercial and residential buildings, decorative patios, bathrooms, saunas, kitchens, building foyer, driveways, pool decks, porches, walkways, sidewalks, and the like. Tiles may take on many forms depending on their intended use and/or intended geographical location of use, varying in shape, size, weight, and may be solid, webbed, cellular or hollow. Tiles of the invention may vary in dimension, e.g., lengths ranging from 100 to 1000 mm, including 250 to 500 mm, such as 250 to 300 mm; widths ranging from 50 to 1000 mm, including 100 to 250 mm, such as 125 to 175 mm; and thickness ranging from 10 to 30 mm, including 15 to 25 mm, such as 15 to 20 mm. The compressive strengths of tiles of the invention may also vary, in certain instances ranging from 5 to 75 MPa, including 15 to 40 MPa, such as 25 MPa. The flexural strength of tiles of the invention may vary, ranging from 0.5 to 7.5 MPa, including 2 to 5 MPa, such as 2.5 MPa. The maximum water absorption of tiles of the invention may also vary, in certain instances ranging from 5 to 15%, including 7 to 12%.

Tiles of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.25%, including 0.025 to 0.075%, such as 0.05%. Tiles used to pave areas exposed to heavy traffic (e.g., pedestrian, vehicular, etc.) may have an abrasion resistance index that may vary considerably, ranging from 0.1 to 0.5, including 0.25. In addition, tiles may have a volume abrasion loss ranging from 1.0 to 4.0 $cm^3/cm^2$, including 1.5 to 3.0 $cm^3/cm^2$, such as 2.7 $cm^3/cm^2$. Tiles may be polygonal, circular or take on any other desired shape. As such, the $CO_2$-sequestering building material composition of the invention may be molded or cast into the desired tile shape and size. The shaped composition may be further compacted by roller compaction, hydraulic pressure, vibrational compaction, or resonant shock compaction. The resultant composition may also be poured out into sheets or a roller may be used to form sheets of a desired thickness. The sheets are then cut to the desired dimensions of the tiles. In some instances, the resultant composition may also be foamed using mechanically or chemically introduced gases prior to being shaped or while the composition is setting in order to form a lightweight tile. The shaped composition is then allowed to set and further cured in an environment with a controlled temperature and humidity. Tiles may be further polished, colored, textured, shot blasted, inlaid with decorative components and the like.

Construction panels are formed building materials employed in a broad sense to refer to any non-load-bearing structural element that are characterized such that their length and width are substantially greater than their thickness. Exemplary construction panels of the invention include cement boards, fiber-cement sidings, and drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm. Cement boards comprise construction panels conventionally prepared as a combination of cement and fiberglass and possess additional fiberglass reinforcement at both faces of the board. Fiber-cement sidings comprise construction panels conventionally prepared as a combination of cement, aggregate, interwoven cellulose, and/or polymeric fibers and possess a texture and flexibility that resembles wood. Drywall comprises construction panels conventionally prepared from gypsum plaster (i.e., semi-hydrous form of calcium sulfate), fibers (glass or paper) and is sandwiched between two sheets of outer material, e.g., paper or fiberglass mats.

One type of construction panel provided by the invention is cement board. They are formed building materials where in some embodiments, are used as backer boards for ceramics that may be employed behind bathroom tiles, kitchen counters, backsplashes, etc. and may have lengths ranging from 100 to 200 cm, such as 125 to 175 cm, e.g., 150 to 160 cm; a breadth ranging from 75 to 100 cm, such as 80 to 100 cm, e.g., 90 to 95 cm, and a thickness ranging from 5 to 25 mm, e.g., 5 to 15 mm, including 5 to 10 mm. Cement boards of the invention may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments of the invention, cement boards may be employed in environments having extensive exposure to moisture (e.g., commercial saunas). The maximum water absorption of the cement boards of the invention may vary, ranging from 5 to 15% by weight, including 8 to 10%, such as 9%. Cement boards of the invention may also undergo moisture movement (expansion or contraction) due to the absorption or loss of water to its environment. The dimensional stability (i.e., linear shrinkage or expansion) due to moisture movement may vary, in certain instances ranging from 0.035 to 0.1%, including 0.04 to 0.08%, such as 0.05 to 0.06%. The $CO_2$-sequestering building composition of the invention may be used to produce the desired shape and size to form a cement board. In addition, a variety of further components may be added to the cement boards which include but are not limited to: plasticizers, foaming agents, accelerators, retarders and air entrainment additives. The $CO_2$-sequestering building material composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards. In some instances, the resultant composition may also be foamed using mechanically or chemically introduced gases prior to being shaped or while the composition is setting in order to form a lightweight cement board. The shaped composition is then allowed to set and further cured in an environment with a controlled temperature and humidity. The cement boards of the invention then may be covered in a fiberglass mat on both faces of the board. Where desired, the cement boards of the current invention may also be prepared using chemical admixtures such that they possess increased fire, water, and frost resistance as well as resistance to damage by bio-degradation and corrosion. The cement board of the current invention may also be combined with components such as dispersed glass fibers, which may impart improved durability, increased flexural strength, and a smoother surface.

Another type of construction panel provided by the invention is fiber-cement siding. Fiber-cement sidings of the invention are formed building materials used to cover the exterior or roofs of buildings and include, but are not limited to building sheets, roof panels, ceiling panels, eternits, and the like. They may also find use as a substitute for timber fascias and barge boards in high fire areas. Fiber-cement sidings may have dimensions that vary, ranging from 200 to 400 cm in length, e.g., 250 cm and 50 to 150 cm in width, e.g., 100 cm and a thickness ranging from 4 to 20 mm, e.g., 5 to 15 mm, including 10 mm. Fiber-cement sidings of the invention may possess physical and mechanical properties that vary. In some embodiments, the flexural strength may range between 0.5 to 5 MPa, including 1 to 3 MPa, such as 2 MPa. The compressive strengths may also vary, in some instances ranging from 2 to 25 MPa, including 10 to 15 MPa, such as 10 to 12 MPa. In some embodiments of the invention, fiber-cement sidings may be employed on buildings that are subject to varying weather conditions, in some embodiments ranging from extremely arid to wet (i.e., low to high levels of humidity). Accordingly, the maximum water absorption of the fiber-cement sidings of the invention may vary, ranging from 10 to 25% by mass, including 10 to 20%, such as 12 to 15%. The dimensional stability (i.e., linear shrinkage or expansion) due to moisture movement may vary, in certain instances ranging from 0.05 to 0.1%, including 0.07 to 0.09%. The $CO_2$-sequestering building composition of the invention may be used to produce the desired shape and size to form a fiber-cement siding. In addition, a variety of further components may be added to the fiber-cement sidings which include but are not limited to: cellulose fibers, plasticizers, foaming agents, accelerators, retarders and air entrainment additives. The $CO_2$-sequestering building material composition is then poured into sheet molds or a roller is used to form sheets of a desired thickness. The shaped composition may be further compacted by roller compaction, hydraulic pressure, vibrational compaction, or resonant shock compaction. The sheets are then cut to the desired dimensions of the fiber-cement sidings. In some instances, the resultant composition may also be foamed using mechanically or chemically introduced gases prior to being shaped or while the composition is setting in order to form a lightweight fiber-cement siding. The shaped composition is then allowed to set and further cured in an environment with a controlled temperature and humidity. The fiber-cement sidings of the invention may then be covered with a polymeric film, enamel or paint. Where desired, the fiber-cement sidings of the current invention may also be prepared using chemical admixtures such that they possess increased fire, water, and frost resistance as well as resistance to damage by bio-degradation and corrosion.

Another type of construction panel provided by the invention is drywall. The term drywall refers to the commonly manufactured building material that is used to finish construction of interior walls and ceilings. In certain instances, drywall building materials are panels that are made of a paper liner wrapped around an inner core. The inner core of drywall of the invention will include at least some amount of a carbonate/bicarbonate component (e.g., $CO_2$-sequestering component) of the invention. The dimensions of the drywall building materials of the invention may vary, in certain instances ranging from 100 to 200 cm, such as 125 to 175 cm, e.g., 150 to 160 cm in length; ranging from 75 to 100 cm, such as 80 to 100 cm, e.g., 90 to 95 cm in breadth, and ranging from 5 to 50 mm, e.g., 5 to 30 mm, including 10 to 25 mm in thickness. Drywall provided by the invention may possess physical and mechanical properties that vary considerably, and may depend upon the amount of the conventional constituents of drywall preparation that are replaced with the carbonate compound composition (e.g., $CO_2$-sequestering composition). The flexural and compressive strengths of drywall provided by the invention are generally larger than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. The maximum water absorption of drywall of the invention may vary, ranging from 2 to 10% by mass, including 4 to 8%, such as 5%. In certain embodiments, the inner core will be analogous to a conventional drywall core which is made primarily from gypsum plaster (the semi-hydrous form of calcium sulfate ($CaSO_4 \cdot \frac{1}{2}H_2O$), with at least a portion of the gypsum component replaced with the carbonate/bicarbonate component (e.g., $CO_2$-sequestering component). In addition, the core may include a variety of further components, such as but not limited to: fibers (e.g., paper and/or fiberglass), plasticizers, foaming agents, accelerators, e.g., potash, retarders, e.g., EDTA or other chelators, various additives that increase mildew and fire resistance (e.g., fiberglass or vermiculite), and water. The portion of components replaced with the carbonate/bicarbonate component (e.g., $CO_2$-sequestering component) may vary, and in certain instances is 5% by weight or more, including 10% by weight or more, 25% by weight or more, 50% by weight or more, 75% by weight or more, 90% by weight or more, or even 100% by weight. In producing the drywall, the core components may be combined and the resultant composition sandwiched between two sheets of outer material, e.g., heavy paper or fiberglass mats. When the core sets and is dried in a large drying chamber, the sandwich becomes rigid and strong enough for use as a building material.

Another building material provided by the invention is a conduit. Conduits are tubes or analogous structures configured to convey a gas or liquid, from one location to another. Conduits of the current invention can include any of a number of different structures used in the conveyance of a liquid or gas that include, but are not limited to pipes, culverts, box culverts, drainage channels and portals, inlet structures, intake towers, gate wells, outlet structures, and the like. Conduits of the invention may vary considerably in shape, which is generally determined by hydraulic design and installation conditions. Shapes of conduits of the current invention may include, but are not limited to circular, rectangular, oblong, horseshoe, square, etc. Multiple cell configurations of conduits are also possible. Conduit design may vary depending on its intended use. As such, conduits of the invention may have dimensions that vary considerably. Conduits may have outer diameters which range in length from 5 to 500 cm or longer, such as 10 to 300 cm, e.g., 25 to 250 cm. The wall thicknesses may vary considerably, ranging in certain instances from 0.5 to 25 cm or thicker, such as 1 to 15 cm, e.g., 1 to 10 cm. In certain embodiments, conduits of the current invention may be designed in order to support high internal pressure from water flow within the conduit. In yet other embodiments, conduits of the invention may be designed to support high external loadings (e.g., earth loads, surface surcharge loads, vehicle loads, external hydrostatic pressures, etc.). Accordingly, the compressive strength of the walls of conduits of the invention may also vary, depending on the size and intended use of the conduit, in some instances ranging, from 5 to 75 MPa, such as 10 to 50 MPa, e.g., 15 to 40 MPa. Where desired, the conduits may be employed with various coatings or liners (e.g., polymeric), and may be configured for easy joining with each other to produce long conveyance structures made up of multiple conduits of the invention. In producing conduits of the invention, the $CO_2$-sequestering building material composition is poured into a mold in order to form the desired conduit shape and size. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight conduit structure. The shaped composition is further allowed to set and is cured in an environment with a controlled temperature and humidity. In addition, the conduits of the invention may include a variety of further components, such as but not limited to: plasticizers, foaming agents, accelerators, retarders and air entrainment additives. Where desired, the further components may include chemical admixtures such that the conduits of the invention possess increased resistance to damage by bio-degradation, frost, water, fire and corrosion. In some embodiments, the conduits of the invention may employ structural support components such as, but not limited to, cables, wires and mesh composed of steel, polymeric materials, ductile iron, aluminum or plastic.

Another building material provided by the invention is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc. Basins may vary in shape, size, and volume capacity. Basins may be rectangular, circular, spherical, or any other shape depending on its intended use. In some embodiments, basins may possess a greater width than depth, becoming smaller toward the bottom. The dimensions of the basin may vary depending on the intended use of the structure (e.g., from holding a few gallons of liquid to several hundred or several thousand or more gallons of liquid). The wall thicknesses may vary considerably, ranging in certain instances from 0.5 to 25 cm or thicker, such as 1 to 15 cm, e.g., 1 to 10 cm. Accordingly, the compressive strength may also vary considerably, depending on the size and intended use of the basin, in some instances ranging, from 5 to 60 MPa, such as 10 to 50 MPa, e.g., 15 to 40 MPa. In some embodiments, the basin may be designed to support high external loadings (e.g., earth loads, surface surcharge loads, vehicle loads, etc.). In certain other embodiments, the basins may be employed with various coatings or liners (e.g., polymeric), and may be configured so that they may be combined with conveyance elements (e.g., drainage pipe). In other embodiments, basins of the invention may be configured so that they may be connected to other basins so that they may form a connected series of basins. In producing basins of the invention, the $CO_2$-sequestering building material composition may be poured into a mold to form the desired basin shape and size. The shaped composition may be further compacted by roller compaction, hydraulic pressure, vibrational compaction, or resonant shock compaction. The basins may also be prepared by pouring the composition into sheet molds and the basins further assembled by combining the sheets together to form basins with varying dimensions (e.g., polygonal basins, rhomboidal basins, etc.). In some instances, the resultant composition may also be foamed using mechanically or chemically introduced gases prior to being shaped or while the composition is setting in order to form a lightweight basin structure. The shaped composition is further allowed to set and is cured in an environment with a controlled temperature and humidity. In addition, the basins of the invention may include a variety of further components, such as but not limited to: plasticizers, foaming agents, accelerators, retarders and air entrainment additives. Where desired, the further components may include chemical admixtures such that the basins of the invention possess increased resistance to damage by bio-degradation, frost, water, fire and corrosion. In some embodiments, the basins of the invention may employ structural support components such as, but not limited to cables, wires and mesh composed of steel, polymeric materials, ductile iron, aluminum or plastic.

Another building material provided by the invention is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams of the invention may also be horizontal load-bearing units, which include, but are not limited to joists, lintels, archways and cantilevers. Beams generally have a much longer length than their longest cross-sectional dimension, where the length of the beam may be 5-fold or more, 10-fold or more, 25-fold or more, longer than the longest cross-sectional dimension. Beams of the invention may vary in their mechanical and physical properties. For example, unreinforced concrete beams may possess flexural capacities that vary, ranging from 2 to 25 MPa, including 5 to 15 MPa, such as 7 to 12 MPa and compressive strengths that range from 10 to 75 MPa, including 20 to 60 MPa, such as 40 MPa. Structurally reinforced concrete beams of the invention may possess considerably larger flexural capacities, ranging from 15 to 75 MPa, including as 25 to 50 MPa, such as 30 to 40 MPa and compressive strengths that range from 35 to 150 MPa, including 50 to 125 MPa, such as 75 to 100 MPa. The beams of the invention may be internal or external, and may be symmetrically loaded or asymmetrically loaded. In some embodiments, beams may be composite, wherein it acts compositely with other structural units by the introduction of appropriate interface shear mechanisms. In other embodiments, beams may be non-composite, wherein it utilizes the properties of the basic beam alone. In producing beams of the invention, the $CO_2$-sequestering building material composition may be poured into a beam mold or cast around a correlated steel reinforcing beam structure (e.g., steel rebar). In some embodiments, the steel reinforcement is pretensioned prior to casting the composition around the steel framework. In other embodiments, beams of the invention may be cast with a steel reinforcing cage that is mechanically anchored to the concrete beam. The beams of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the beams of the invention may include a variety of further components, such as but not limited to: plasticizers, foaming agents, accelerators, retarders and air entrainment additives. Where desired, the further components may include chemical admixtures such that the beams of the invention possess increased resistance to damage by bio-degradation, frost, water, fire and corrosion.

Another building material provided by the invention is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts. Columns of the invention may be rigid, upright supports, composed of relatively few pieces. Columns may also be decorative pillars having a cylindrical or polygonal, smooth or fluted, tapered or straight shaft with a capital and usually a base, among other configurations. The capital and base of the column may have a similar shape as the column or may be different. Any combination of shapes for the capital and base on a column are possible. Polygonal columns of the invention possess a width that is not more than four times its thickness. Columns of the invention may be constructed such that they are solid, hollow (e.g., decorative columns), reinforcement filled, or any combination thereof. Columns of the invention can be short columns (i.e., columns where strength is governed by construction components and the geometry of its cross section) or slender columns (i.e., cross-sectional dimensions that are less than 5 times its length). The dimensions of the column may vary greatly depending on the intended use of the structure, e.g., from being less than a single story high, to several stories high or more, and having a corresponding width. Columns of the invention may vary in their mechanical and physical properties. Properties such as compressive and flexural strengths may vary depending on the design and intended use of the column. For example, unreinforced concrete columns may possess flexural strengths that range from 2 to 20 MPa, including 5 to 15 MPa, such as 7 to 12 MPa and compressive strengths that range from 10 to 100 MPa, including 25 to 75 MPa, such as 50 MPa. Structurally reinforced concrete columns of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In some embodiments, columns may be composite, wherein it may act compositely with other structural units by the introduction of interfacial shear mechanisms. In other embodiments, columns may be non-composite, wherein it utilizes the properties of the basic column alone. In producing columns of the invention, the $CO_2$-sequestering building material composition may be poured into a column form or cast around a correlated steel reinforcing column structure (e.g., steel rebar). In some embodiments, the steel reinforcement is pretensioned prior to casting the composition around the steel framework. In other embodiments, columns of the invention may be cast with a steel reinforcing cage that is mechanically anchored to the concrete column. The columns of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the columns of the invention may include a variety of additional components, such as but not limited to: plasticizers, foaming agents, accelerators, retarders and air entrainment additives. Where desired, these additional components may include chemical admixtures such that the columns of the invention possess increased resistance to damage by bio-degradation, frost, water, fire and corrosion.

Another building material provided by the invention is a concrete slab. Concrete slabs are those building materials used in the construction of prefabricated foundations, floors and wall panels. In some instances, a concrete slab may be employed as a floor unit. (e.g., hollow plank unit or double tee design) In other instances, a precast concrete slab may be a shallow precast plank used as a foundation for in-situ concrete formwork. Wall panels are, in a broad sense, vertical load-bearing members of a building that are polygonal and possess a width that is more that four times its thickness. Precast concrete foundation, floors and wall panels may vary considerably in dimension depending on the intended use of the precast concrete slab (e.g., one or two storey building). As such, precast concrete slabs may have dimensions which range from 1 to 10 m in length or longer, including 3 to 8 m, such as 5 to 6 m; height that ranges from 1 to 10 m or taller, including 4 to 10 m, such as 4 to 5 m; and a thickness that may range from 0.005 to 0.25 m or thicker, including 0.1 to 0.2 m such as 0.1 to 0.15 m. Formed building materials of the invention such as slabs, and structures made therefrom, may be thicker than corresponding structures that lack carbonate/bicarbonate components (e.g., $CO_2$-sequestering components) of the invention. In addition, structures made from amorphous building materials comprising carbonate/bicarbonate components (e.g., $CO_2$-sequestering components) of the invention may be thicker than corresponding structures that lack the carbonate/bicarbonate components (e.g., $CO_2$-sequestering components). Such increased thickness directly relates to increased carbonate/bicarbonate component (e.g., $CO_2$-sequestering component) content. In some embodiments, thickness of formed building materials or related structures is increased by 1.5 fold or more, 2-fold or more, or 5-fold or more. Concrete slabs of the invention may vary in their mechanical and physical properties depending on their intended use. For example, a prefabricated slab that is employed in a floor unit may possess larger flexural strengths and lesser compressive strengths than a slab that is employed as a load-bearing wall. For example, unreinforced concrete slabs may possess flexural strengths that vary, ranging from 2 to 25 MPa, including 5 to 15 MPa, such as 7 to 12 MPa and compressive strengths that range from 10 to 100 MPa, including 25 to 75 MPa, such as 50 MPa. Structurally reinforced concrete slabs of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In producing concrete slabs of the invention, the $CO_2$-sequestering building material composition may be poured into a slab mold or cast around a correlated steel reinforcing structure (e.g., steel rebar). In some embodiments, the steel reinforcement is pretensioned prior to casting the composition around the steel framework. In other embodiments, slabs of the invention may be cast with a steel reinforcing cage that is mechanically anchored to the concrete slab. In some embodiments, the concrete slabs of the invention may improve its structural capacity by casting a second, supportive concrete layer that is mechanically anchored to the previously precast concrete slab. The slabs of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the slabs of the invention may include a variety of further components, such as but not limited to: plasticizers, foaming agents, accelerators, retarders and air entrainment additives. Where desired, the further components may include chemical admixtures such that the slabs of the invention possess increased resistance to damage by bio-degradation, frost, water, fire and corrosion.

Another building material provided by the invention is an acoustic barrier, which refers to a structure used as a barrier for the attenuation or absorption of sound. As such, an acoustic barrier may include, but is not limited to structures such as acoustical panels, reflective barriers, absorptive barriers, reactive barriers, etc. Acoustic barriers of the invention may widely vary in size and shape. Acoustic barriers may be polygonal, circular, or any other shape depending on its intended use. Acoustic barrier may be employed in the attenuation of sound from highways, roadways, bridges, industrial facilities, power plants, loading docks, public transportation stations, military facilities, gun ranges, housing complexes, entertainment venues (e.g., stadiums, concert halls) and the like. Acoustic barriers may also be employed for sound insulation for the interior of homes, music studios, movie theaters, classrooms, etc. The acoustic barriers of the invention may have dimensions that vary greatly depending on its intended use, ranging from 0.5 to 10 m in length or longer, e.g., 5 m and 0.1 to 10 m in height/width or wider, e.g., 5 m and a thickness ranging from 10 to 100 cm, or thicker e.g., 25 to 50 cm, including 40 cm. Where desired, the acoustic barrier may be employed with various coatings or liners (e.g., polymeric), and may be configured for easy joining with each other or pillars separating additional acoustic barriers to produce long acoustic barrier structures made up of multiple acoustic barriers of the invention. In some embodiments, acoustic barriers of the invention may employ sound absorptive material (e.g., wood shavings, textile fibers, glass wool, rock wool, polymeric foam, vermiculite, etc.) in addition to a structurally reinforcing framework. In some embodiments, acoustic barriers of the invention may be used as noise-reduction barriers in an outdoor environment (e.g., along a highway, near an airport, etc.) and may be employed with structural support components (e.g., columns, posts, beams, etc.). In producing acoustic barriers of the invention, the $CO_2$-sequestering building material composition is poured into a mold to form the desired acoustic barrier shape and size. Also the composition may be poured out into a sheet mold or a roller may be used to form sheets of a desired thickness. The shaped composition may be further compacted by roller compaction, hydraulic pressure, vibrational compaction, or resonant shock compaction. The sheets are then cut to the desired dimensions of the acoustic barriers. In some instances, the resultant composition may also be foamed using mechanically or chemically introduced gases prior to being shaped or while the composition is setting in order to form a lightweight acoustic panel structure. The shaped composition is further allowed to set and is cured in an environment with a controlled temperature and humidity. In addition, the acoustic barriers of the invention may include a variety of further components, such as but not limited to: plasticizers, foaming agents, accelerators, retarders and air entrainment additives. Where desired, the further components may include chemical admixtures such that they possess increased resistance to damage by bio-degradation, frost, water, fire and corrosion. In some embodiments, the acoustic barriers of the invention may employ structural support components such as, but not limited to cables, wires and mesh composed of steel, ductile iron, polymeric fibers, aluminum or plastic.

Another building material provided by the invention is an insulation material, which refers to a material used to attenuate or inhibit the conduction of heat. Insulation may also include those materials that reduce or inhibit radiant transmission of heat. Insulation material of the invention may consist of one or more of the following constituents: a cementitious forming material, a dispersing agent, an air entraining agent, inert densifying particulate, a mixture of ionic and non-ionic surfactants, plasticizers, accelerators, lightweight aggregate, organic and inorganic binding agents and glass particles. In certain embodiments of the invention, an amount of cementitious forming material may be replaced by the above described component (e.g., $CO_2$-sequestering component) where it may be 1% by weight or more, such as 3% by weight or more, including 5% by weight or more, such as 25% by weight or more, 50% by weight or more, etc. Binding compositions for the insulation material of the invention include a component selected from the group consisting of carbides, Gypsum powder, Blakite, nitrides, calcium carbonate, oxides, titanates, sulfides, zinc selenide, zinc telluride, inorganic siloxane compound and their mixtures thereof. In certain embodiments of the invention, an amount of the binding composition may be replaced by the above described component (e.g., $CO_2$-sequestering component) and may be 1% by weight or more, such as 3% by weight or more, including 5% by weight or more, such as 25% by weight or more, 50% by weight or more, etc. Where desired, insulation material of the invention may also be prepared using a chemical admixture or any other convenient protocol such that they are resistant to damage by termites, insects, bacteria, fungus, etc. Insulation materials of the invention may be prepared using any convenient protocol such that they are freeze/thaw, rain and fire resistant. Insulation material of the invention may be prepared in accordance with traditional manufacturing protocols for such materials, with the exception that an amount of carbonate/bicarbonate component (e.g., $CO_2$-sequestering component) of the invention is employed. In producing the insulation materials of the invention, an amount of the carbonate/bicarbonate component (e.g., $CO_2$-sequestering component) may be combined with water and other components of the insulation material, which may include, but are not limited to a dispersing agent, an air entraining agent, inert densifying particulate, a mixture of ionic and non-ionic surfactants, plasticizers, accelerators, lightweight aggregate, organic and inorganic binding agents and glass particles. The resultant insulation material may then be molded into the desired shape (e.g., wall panel) or poured into the void space of concrete masonry units, flooring units, roof decks or cast around pipes, conduits and basins.

Preparation of CO2-Sequestering Building Materials

Aspects of the invention include methods of preparing $CO_2$-sequestering building materials. $CO_2$-sequestering building materials may be prepared by first producing a carbonate/bicarbonate component (e.g., $CO_2$-sequestering component [i.e., precipitation material]) and then preparing the building material from the carbonate/bicarbonate component (e.g., $CO_2$-sequestering component). The carbonate/bicarbonate component (e.g., $CO_2$-sequestering component) of $CO_2$-sequestering building materials (e.g., formed building materials) may be produced from a source of $CO_2$, a source of proton-removing agents (and/or methods of effecting proton removal), and a source of divalent cations, each of which materials are described in further detail immediately below.

Carbon Dioxide

Methods of the invention include contacting a volume of an aqueous solution of divalent cations with a source of $CO_2$, then subjecting the resultant solution to conditions that facilitate precipitation. Methods of the invention further include contacting a volume of an aqueous solution of divalent cations with a source of $CO_2$ while subjecting the aqueous solution to conditions that facilitate precipitation. There may be sufficient carbon dioxide in the divalent cation-containing solution to precipitate significant amounts of carbonate-containing precipitation material (e.g., from seawater); however, additional carbon dioxide is generally used. The source of $CO_2$ may be any convenient $CO_2$ source. The $CO_2$ source may be a gas, a liquid, a solid (e.g., dry ice), a supercritical fluid, or $CO_2$ dissolved in a liquid. In some embodiments, the $CO_2$ source is a gaseous $CO_2$ source. The gaseous stream may be substantially pure $CO_2$ or comprise multiple components that include $CO_2$ and one or more additional gases and/or other substances such as ash and other particulates. In some embodiments, the gaseous $CO_2$ source is a waste gas stream (i.e., a by-product of an active process of the industrial plant) such as exhaust from an industrial plant. The nature of the industrial plant may vary, the industrial plants including, but not limited to, power plants, chemical processing plants, mechanical processing plants, refineries, cement plants, steel plants, and other industrial plants that produce $CO_2$ as a by-product of fuel combustion or another processing step (such as calcination by a cement plant).

Waste gas streams comprising $CO_2$ include both reducing (e.g., syngas, shifted syngas, natural gas, hydrogen and the like) and oxidizing condition streams (e.g., flue gases from combustion). Particular waste gas streams that may be convenient for the invention include oxygen-containing combustion industrial plant flue gas (e.g., from coal or another carbon-based fuel with little or no pretreatment of the flue gas), turbo charged boiler product gas, coal gasification product gas, shifted coal gasification product gas, anaerobic digester product gas, wellhead natural gas stream, reformed natural gas or methane hydrates, and the like. Combustion gas from any convenient source may be used in methods and systems of the invention. In some embodiments, combustion gases in post-combustion effluent stacks of industrial plants such as power plants, cement plants, and coal processing plants is used.

Thus, the waste streams may be produced from a variety of different types of industrial plants. Suitable waste streams for the invention include waste streams produced by industrial plants that combust fossil fuels (e.g., coal, oil, natural gas) and anthropogenic fuel products of naturally occurring organic fuel deposits (e.g., tar sands, heavy oil, oil shale, etc.). In some embodiments, a waste stream suitable for systems and methods of the invention is sourced from a coal-fired power plant, such as a pulverized coal power plant, a supercritical coal power plant, a mass burn coal power plant, a fluidized bed coal power plant; in some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries are also useful sources of waste streams that include carbon dioxide.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include CO, mercury and other heavy metals, and dust particles (e.g., from calcining and combustion processes). Additional components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm, such as 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm. The waste streams, particularly various waste streams of combustion gas, may include one or more additional components, for example, water, NOx (mononitrogen oxides: NO and $NO_2$), SOx (monosulfur oxides: SO, $SO_2$ and $SO_3$), VOC (volatile organic compounds), heavy metals such as mercury, and particulate matter (particles of solid or liquid suspended in a gas). Flue gas temperature may also vary. In some embodiments, the temperature of the flue gas comprising $CO_2$ is from 0° C. to 2000° C., such as from 60° C. to 700° C., and including 100° C. to 400° C.

In some embodiments, one or more additional components or co-products (i.e., products produced from other starting materials [e.g., SOx, NOx, etc.] under the same conditions employed to convert $CO_2$ into carbonates) are precipitated or trapped in precipitation material formed by contacting the waste gas stream comprising these additional components with an aqueous solution comprising divalent cations (e.g., alkaline earth metal ions such as $Ca^{2+}$ and $Mg^{2+}$). Sulfates, sulfites, and the like of calcium and/or magnesium may be precipitated or trapped in precipitation material (further comprising calcium and/or magnesium carbonates) produced from waste gas streams comprising SOx (e.g., $SO_2$). Magnesium and calcium may react to form $MgSO_4$, $CaSO_4$, respectively, as well as other magnesium-containing and calcium-containing compounds (e.g., sulfites), effectively removing sulfur from the flue gas stream without a desulfurization step such as flue gas desulfurization ("FGD"). In addition, $CaCO_3$, $MgCO_3$, and related compounds may be formed without additional release of $CO_2$. In instances where the aqueous solution of divalent cations contains high levels of sulfur compounds (e.g., sulfate), the aqueous solution may be enriched with calcium and magnesium so that calcium and magnesium are available to form carbonate compounds after, or in addition to, formation of $CaSO_4$, $MgSO_4$, and related compounds. In some embodiments, a desulfurization step may be staged to coincide with precipitation of carbonate-containing precipitation material, or the desulfurization step may be staged to occur before precipitation. In some embodiments, multiple reaction products (e.g., $MgCO_3$, $CaCO_3$, $CaSO_4$, mixtures of the foregoing, and the like) are collected at different stages, while in other embodiments a single reaction product (e.g., precipitation material comprising carbonates, sulfates, etc.) is collected. In step with these embodiments, other components, such as heavy metals (e.g., mercury, mercury salts, mercury-containing compounds), may be trapped in the carbonate-containing precipitation material or may precipitate separately.

A portion of the gaseous waste stream (i.e., not the entire gaseous waste stream) from an industrial plant may be used to produce precipitation material. In these embodiments, the portion of the gaseous waste stream that is employed in precipitation of precipitation material may be 75% or less, such as 60% or less, and including 50% and less of the gaseous waste stream. In yet other embodiments, substantially (e.g., 80% or more) the entire gaseous waste stream produced by the industrial plant is employed in precipitation of precipitation material. In these embodiments, 80% or more, such as 90% or more, including 95% or more, up to 100% of the gaseous waste stream (e.g., flue gas) generated by the source may be employed for precipitation of precipitation material.

Although industrial waste gas offers a relatively concentrated source of combustion gases, methods and systems of the invention are also applicable to removing combustion gas components from less concentrated sources (e.g., atmospheric air), which contains a much lower concentration of pollutants than, for example, flue gas. Thus, in some embodiments, methods and systems encompass decreasing the concentration of pollutants in atmospheric air by producing a stable precipitation material. In these cases, the concentration of pollutants, e.g., $CO_2$, in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in atmospheric pollutants may be accomplished with yields as described herein, or with higher or lower yields, and may be accomplished in one precipitation step or in a series of precipitation steps.

Divalent Cations

Methods of the invention include contacting a volume of an aqueous solution of divalent cations with a source of $CO_2$ and subjecting the resultant solution to conditions that facilitate precipitation. In some embodiments, a volume of an aqueous solution of divalent cations is contacted with a source of $CO_2$ while subjecting the aqueous solution to conditions that facilitate precipitation. Divalent cations may come from any of a number of different divalent cation sources depending upon availability at a particular location. Such sources include industrial wastes, seawater, brines, hard waters, rocks and minerals (e.g., lime, periclase, material comprising metal silicates such as serpentine and olivine), and any other suitable source.

In some locations, industrial waste streams from various industrial processes provide for convenient sources of divalent cations (as well as in some cases other materials useful in the process, e.g., metal hydroxide). Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Fossil fuel burning ash, cement kiln dust, and slag, collectively waste sources of metal oxides, further described in U.S. patent application Ser. No. 12/486,692, filed 17 Jun. 2009, the disclosure of which is incorporated herein in its entirety. Any of the divalent cations sources described herein may be mixed and matched for the purpose of practicing the invention. For example, material comprising metal silicates (e.g. serpentine, olivine), which are further described in U.S. patent application Ser. No. 12/501,217, filed 10 Jul. 2009, which application is herein incorporated by reference, may be combined with any of the sources of divalent cations described herein for the purpose of practicing the invention.

In some locations, a convenient source of divalent cations for preparation of a carbonate/bicarbonate component (e.g., $CO_2$-sequestering component) of the invention is water (e.g., an aqueous solution comprising divalent cations such as seawater or surface brine), which may vary depending upon the particular location at which the invention is practiced. Suitable aqueous solutions of divalent cations that may be used include solutions comprising one or more divalent cations, e.g., alkaline earth metal cations such as $Ca^{2+}$ and $Mg^{2+}$. In some embodiments, the aqueous source of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other salines having a salinity that is greater than that of freshwater, any of which may be naturally occurring or anthropogenic. Brackish water is water that is saltier than freshwater, but not as salty as seawater. Brackish water has a salinity ranging from about 0.5 to about 35 ppt (parts per thousand). Seawater is water from a sea, an ocean, or any other saline body of water that has a salinity ranging from about 35 to about 50 ppt. Brine is water saturated or nearly saturated with salt. Brine has a salinity that is about 50 ppt or greater. In some embodiments, the water source from which divalent cations are derived is a mineral rich (e.g., calcium-rich and/or magnesium-rich) freshwater source. In some embodiments, the water source from which divalent cations are derived is a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cation are derived is an anthropogenic brine selected from a geothermal plant wastewater or a desalination wastewater.

Freshwater is often a convenient source of divalent cations (e.g., cations of alkaline earth metals such as $Ca^{2+}$ and $Mg^{2+}$), Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., $Ca^{2+}$, $Mg^{2+}$, etc.) to produce a mineral-rich water that is suitable for methods and systems described herein. Divalent cations or precursors thereof (e.g. salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from Na+ and K+ are added to freshwater. In some embodiments, freshwater comprising $Ca^{2+}$ is combined with combustion ash (e.g., fly ash, bottom ash, boiler slag), or products or processed forms thereof, yielding a solution comprising calcium and magnesium cations.

In some embodiments, an aqueous solution of divalent cations may be obtained from an industrial plant that is also providing a combustion gas stream. For example, in water-cooled industrial plants, such as seawater-cooled industrial plants, water that has been used by an industrial plant for cooling may then be used as water for producing precipitation material. If desired, the water may be cooled prior to entering a precipitation system of the invention. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity.

Proton-Removing Agents and Methods for Effecting Proton Removal

Methods of the invention include contacting a volume of an aqueous solution of divalent cations with a source of $CO_2$ (to dissolve $CO_2$) and subjecting the resultant solution to conditions that facilitate precipitation. In some embodiments, a volume of an aqueous solution of divalent cations is contacted with a source of $CO_2$ (to dissolve $CO_2$) while subjecting the aqueous solution to conditions that facilitate precipitation. The dissolution of $CO_2$ into the aqueous solution of divalent cations produces carbonic acid, a species in equilibrium with both bicarbonate and carbonate. In order to produce carbonate-containing precipitation material, protons are removed from various species (e.g. carbonic acid, bicarbonate, hydronium, etc.) in the divalent cation-containing solution to shift the equilibrium toward carbonate. As protons are removed, more $CO_2$ goes into solution. In some embodiments, proton-removing agents and/or methods are used while contacting a divalent cation-containing aqueous solution with $CO_2$ to increase $CO_2$ absorption in one phase of the precipitation reaction, wherein the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents that can be found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are provided herein. Some embodiments provide for using naturally alkaline bodies of water as naturally occurring proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as

*Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution. As such, carbonic anhydrase may be used to enhance dissolution of $CO_2$ and accelerate precipitation of precipitation material.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phosphazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from seawater (e.g., $Mg(OH)_2$ such as that found in Moss Landing, Calif.); and wastes from mining processes involving leaching. For example, red mud may be used to modify pH as described in U.S. Provisional Patent Application No. 61/161,369, filed 18 Mar. 2009, which is incorporated herein by reference in its entirety. Fossil fuel burning ash, cement kiln dust, and slag, collectively waste sources of metal oxides, further described in U.S. patent application Ser. No. 12/486,692, filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the precipitation reaction mixture or a precursor solution to the precipitation reaction mixture (i.e., a solution that may or may not contain divalent cations). In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some instances, electrochemical methods to remove protons do not generate any gaseous by-byproduct. Electrochemical methods for effecting proton removal are further described in U.S. patent application Ser. No. 12/344,019, filed 24 Dec. 2008; U.S. patent application Ser. No. 12/375,632, filed 23 Dec. 2008; International Patent Application No. PCT/US08/088,242, filed 23 Dec. 2008; International Patent Application No. PCT/US09/32301, filed 28 Jan. 2009; and International Patent Application No. PCT/US09/48511, filed 24 Jun. 2009, each of which are incorporated herein by reference in their entirety.

Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. Provisional Patent Application No. 61/081,299, filed 16 Jul. 2008, and U.S. Provisional Patent Application No. 61/091,729, the disclosures of which are incorporated herein by reference. Combinations of the above mentioned sources of proton-removing agents and methods for effecting proton removal may be employed.

Preparation of $CO_2$-Sequestering Components and Building Materials

A variety of different methods may be employed to prepare the $CO_2$-sequestrating component of the invention from the source of $CO_2$, the source of divalent cations, and the source of proton-removing agents. $CO_2$ sequestration protocols of interest include, but are not limited to, those disclosed in U.S. patent application Ser. No. 12/126,776, filed 23 May 2008; Ser. No. 12/163,205, filed 27 Jun. 2008; Ser. No. 12/344,019, filed 24 Dec. 2008; and Ser. No. 12/475,378, filed 29 May 2009, as well as U.S. Provisional Patent Application Ser. Nos. 61/017,405, filed 28 Dec. 2007; 61/017,419, filed 28 Dec. 2007; 61/057,173, filed 29 May 2008; 61/056,972, filed 29 May 2008; 61/073,319, filed 17 Jun. 2008; 61/079,790, 10 Jul. 2008; 61/081,299, filed 16 Jul. 2008; 61/082,766, filed 22 Jul. 2008; 61/088,347, filed 13 Aug. 2008; 61/088,340, filed 12 Aug. 2008; 61/101,629, filed 30 Sep. 2008; and 61/101,631, filed 30 Sep. 2008; the disclosures of which are incorporated herein by reference.

$CO_2$-sequestering components of the invention include carbonate compositions that may be produced by precipitating a calcium and/or magnesium carbonate composition from a solution of divalent cations. The carbonate compound compositions of the invention include precipitated crystalline and/or amorphous carbonate compounds. The carbonate compound compositions that make up the $CO_2$-sequestering components of the invention include metastable carbonate compounds that may be precipitated from a solution of divalent cations, such as a saltwater, as described in greater detail below. For convenience, the invention herein is sometimes described in terms of saltwater; however, it is to be understood that any source of water comprising divalent cations may be used.

Saltwater-derived carbonate compound compositions of the invention (i.e., compositions derived from saltwater and made up of one or more different carbonate crystalline and/or amorphous compounds with or without one or more hydroxide crystalline or amorphous compounds) are ones that are derived from a saltwater. As such, they are compositions that are obtained from a saltwater in some manner, e.g., by treating a volume of a saltwater in a manner sufficient to produce the desired carbonate compound composition from the initial volume of saltwater. The carbonate compound compositions of certain embodiments are produced by precipitation from a solution of divalent cations (e.g., a saltwater) that includes alkaline earth metal cations, such as calcium and magnesium, etc., where such solutions of divalent cations may be collectively referred to as alkaline earth metal-containing waters.

The saltwater employed in methods may vary. As reviewed above, saltwater of interest include brackish water, seawater and brine, as well as other salines having a salinity that is greater than that of freshwater (which has a salinity of less than 5 ppt dissolved salts). In some embodiments, calcium rich waters may be combined with magnesium silicate minerals, such as olivine or serpentine, in solution that has become acidic due to the addition on carbon dioxide to form carbonic acid, which dissolves the magnesium silicate, leading to the formation of calcium magnesium silicate carbonate compounds as mentioned above.

In methods of producing the carbonate compound compositions of the invention, a volume of water is subjected to carbonate compound precipitation conditions sufficient to produce a carbonate-containing precipitation material and a mother liquor (i.e., the part of the water that is left over after precipitation of the carbonate compound(s) from the saltwater). The resultant precipitation material and mother liquor collectively make up the carbonate compound compositions of the invention. Any convenient precipitation conditions may be employed, which conditions result in the production of a carbonate compound composition sequestration product.

Conditions that facilitate precipitation (i.e., precipitation conditions) may vary. For example, the temperature of the water may be within a suitable range for the precipitation of the desired mineral to occur. In some embodiments, the temperature of the water may be in a range from 5 to 70° C., such as from 20 to 50° C. and including from 25 to 45° C. As such, while a given set of precipitation conditions may have a temperature ranging from 0 to 100° C., the temperature of the water may have to be adjusted in certain embodiments to produce the desired precipitation material.

In normal seawater, 93% of the dissolved $CO_2$ is in the form of bicarbonate ions ($HCO_3^-$) and 6% is in the form of carbonate ions ($CO_3^{2-}$). When calcium carbonate precipitates from normal seawater, $CO_2$ is released. In fresh water, above pH 10.33, greater than 90% of the carbonate is in the form of carbonate ion, and no $CO_2$ is released during the precipitation of calcium carbonate. In seawater this transition occurs at a slightly lower pH, closer to a pH of 9.7. While the pH of the water employed in methods may range from 5 to 14 during a given precipitation process, in certain embodiments the pH is raised to alkaline levels in order to drive the precipitation of carbonate compounds, as well as other compounds, e.g., hydroxide compounds, as desired. In certain of these embodiments, the pH is raised to a level that minimizes if not eliminates $CO_2$ production during precipitation, causing dissolved $CO_2$, e.g., in the form of carbonate and bicarbonate, to be trapped in the precipitation material. In these embodiments, the pH may be raised to 10 or higher, such as 11 or higher.

The pH of the water may be raised using any convenient approach. In certain embodiments, a proton-removing agent is employed, where examples of such agents include oxides, hydroxides (e.g., calcium oxide in fly ash, potassium hydroxide, sodium hydroxide, brucite (Mg(OH2), etc.), carbonates (e.g., sodium carbonate), and the like, many of which are described above. One such approach for raising the pH of the precipitation reaction mixture or precursor thereof (e.g., divalent cation-containing solution) is to use the coal ash from a coal-fired power plant, which contains many oxides. Other coal processes, like the gasification of coal, to produce syngas, also produce hydrogen gas and carbon monoxide, and may serve as a source of hydroxide as well. Some naturally occurring minerals, such as serpentine, contain hydroxide and may be dissolved to yield a source of hydroxide. The addition of serpentine also releases silica and magnesium into the solution, leading to the formation of silica-containing precipitation material. The amount of proton-removing agent that is added to the precipitation reaction mixture or precursor thereof will depend on the particular nature of the proton-removing agent and the volume of the precipitation reaction mixture or precursor thereof being modified, and will be sufficient to raise the pH of the precipitation reaction mixture or precursor thereof to the desired pH. Alternatively, the pH of the precipitation reaction mixture or precursor thereof may be raised to the desired level by electrochemical means as described above. Additional electrochemical methods may be used under certain conditions. For example, electrolysis may be employed, wherein the mercury cell process (also called the Castner-Kellner process); the diaphragm cell process, the membrane cell process, or some combination thereof is used. Where desired, byproducts of the hydrolysis product, e.g., $H_2$, sodium metal, etc. may be harvested and employed for other purposes, as desired. In yet other embodiments, the pH-elevating approach described in U.S. Provisional Patent Application Nos. 61/081,299, filed 16 Jul. 2008, and 61/091,729, filed 25 Aug. 2008, may be employed, the disclosures of which are incorporated herein by reference.

Additives other than pH-elevating agents may also be introduced into the water in order to influence the nature of the precipitation material that is produced. As such, certain embodiments of the methods include providing an additive in water before or during the time when the water is subjected to the precipitation conditions. Certain calcium carbonate polymorphs can be favored by trace amounts of certain additives. For example, vaterite, a highly unstable polymorph of $CaCO_3$, which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitation material can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph. As such, a wide range of magnesium:calcium ratios can be employed, including, for example, 100:1, 50:1, 20:1, 10:1, 5:1, 2:1, 1:1, 1:2, 1:5, 1:10, 1:20, 1:50, 1:100, or any of the ratios mentioned above. In certain embodiments, the magnesium:calcium ratio is determined by the source of water employed in the precipitation process (e.g., seawater, brine, brackish water, fresh water), whereas in other embodiments, the magnesium:calcium ratio is adjusted to fall within a certain range.

Rate of precipitation also has a large effect on compound phase formation. The most rapid precipitation can be achieved by seeding the solution with a desired phase. Without seeding, rapid precipitation can be achieved by rapidly increasing the pH of the seawater, which results in more amorphous constituents. When silica is present, the more rapid the reaction rate, the more silica is incorporated in the carbonate-containing precipitation material. The higher the pH is, the more rapid the precipitation is and the more amorphous the precipitation material.

Accordingly, a set of precipitation conditions to produce a desired precipitation material from a solution of divalent cations includes, in certain embodiments, the water's temperature and pH, and in some instances, the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate-containing precipitation material according to the invention may be batch or continuous protocols. It will be appreciated that precipitation conditions may be different to produce a given precipitation material in a continuous flow system compared to a batch system.

In certain embodiments, the methods further include contacting the volume of water that is subjected to the mineral precipitation conditions with a source of $CO_2$. Contact of the water with the source $CO_2$ may occur before and/or during the time when the water is subjected to $CO_2$ precipitation conditions. Accordingly, embodiments of the invention include methods in which the volume of water is contacted with a source of $CO_2$ prior to subjecting the volume of saltwater to mineral precipitation conditions. Embodiments of the invention include methods in which the volume of saltwater is contacted with a source of $CO_2$ while the volume of saltwater is being subjected to carbonate compound precipitation conditions. Embodiments of the invention include methods in which the volume of water is contacted with a source of a $CO_2$ both prior to subjecting the volume of saltwater to carbonate compound precipitation conditions and while the volume of saltwater is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate compounds.

The source of $CO_2$ that is contacted with the volume of saltwater in these embodiments may be any convenient $CO_2$ source, and the contact protocol may be any convenient protocol. Where the $CO_2$ is a gas, contact protocols of interest include, but are not limited to: direct contacting protocols, e.g., bubbling the gas through the volume of saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient. For exemplary system and methods for contacting the solution of divalent cations with the source of $CO_2$, see U.S. Provisional Patent Application Nos. 61/158,992, filed 10 Mar. 2009; 61/168,166, filed 9 Apr. 2009; 61/170,086, filed 16 Apr. 2009; 61/178,475, filed 14 May 2009; 61/228,210, filed 24 Jul. 2009; 61/230,042, filed 30 Jul. 2009; and 61/239,429, filed 2 Sep. 2009, each of which is incorporated herein by reference.

The above protocol results in the production of a slurry of a carbonate/bicarbonate precipitation material (e.g., $CO_2$-sequestering precipitation material) and a mother liquor. Where desired, the compositions made up of the precipitation material and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

The slurry components are then separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. In certain embodiments, the treated brine may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, the mother liquor is returned to the source of feed water for the methods of invention, e.g., an ocean or sea. Alternatively, the mother liquor may be further processed, e.g., subjected to desalination protocols, as described further in U.S. application Ser. No. 12/163,205; the disclosure of which is herein incorporated by reference.

In certain embodiments, following production of the precipitation material (e.g., $CO_2$-sequestering component), the resultant material is separated from the mother liquor to produce separated precipitation material (e.g., $CO_2$-sequestering product). Separation of the precipitation material (e.g., $CO_2$-sequestering component) may be achieved using any convenient approach, including a mechanical approach, e.g., where bulk excess water is drained from the precipitation material, e.g., either by gravity alone or with the addition of vacuum, mechanical pressing, by filtering the precipitation material from the mother liquor to produce a filtrate, etc. Separation of bulk water produces, in certain embodiments, a wet, dewatered precipitation material.

The resultant dewatered precipitation material may then be dried, as desired, to produce a dried product. Drying can be achieved by air drying the wet precipitation material. Where the wet precipitation material is air dried, air drying may be at room or elevated temperature. In yet another embodiment, the wet precipitation material is spray dried to dry the precipitation material, where the liquid containing the precipitation material is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. Where desired, the dewatered precipitation material product may be washed before drying. The precipitation material may be washed with freshwater, e.g., to remove salts (such as NaCl) from the dewatered precipitation material.

In certain embodiments, the precipitation material is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc.

FIG. 1 provides a schematic flow diagram of a process for producing a carbonate/bicarbonate (e.g., $CO_2$-sequestering component) according to an embodiment of the invention. In FIG. 1, saltwater from saltwater source 10 is subjected to carbonate compound precipitation conditions at precipitation step 20. As reviewed above, saltwater refers to any of a number of different types of aqueous fluids other than freshwater, including brackish water, seawater and brine (including man-made brines, e.g., geothermal plant wastewaters, desalination waste waters, etc), as well as other salines having a salinity that is greater than that of freshwater. The saltwater source from which the carbonate compound composition of the cements of the invention is derived may be a naturally occurring source, such as a sea, ocean, lake, swamp, estuary, lagoon, etc., or a man-made source.

In certain embodiments, the water may be obtained from the power plant that is also providing the gaseous waste stream. For example, in water cooled power plants, such as seawater cooled power plants, water that has been employed by the power plant may then be sent to the precipitation system and employed as the water in the precipitation reaction. In certain of these embodiments, the water may be cooled prior to entering the precipitation reactor.

In the embodiment depicted in FIG. 1, the water from saltwater source 10 is first charged with $CO_2$ to produce $CO_2$ charged water, which $CO_2$ is then subjected to carbonate compound precipitation conditions. As depicted in FIG. 1, a $CO_2$ gaseous stream 30 is contacted with the water at precipitation step 20. The provided gaseous stream 30 is contacted with a suitable water at precipitation step 20 to produce a $CO_2$ charged water. By $CO_2$ charged water is meant water that has had $CO_2$ gas contacted with it, where $CO_2$ molecules have combined with water molecules to produce, e.g., carbonic acid, bicarbonate and carbonate ion. Charging water in this step results in an increase in the $CO_2$ content of the water, e.g., in the form of carbonic acid, bicarbonate and carbonate ion, and a concomitant decrease in the $pCO_2$ of the waste stream that is contacted with the water. The $CO_2$ charged water is acidic, having a pH of 6 or less, such as 5 or less and including 4 or less. In certain embodiments, the concentration of $CO_2$ of the gas that is used to charge the water is 10% or higher, 25% or higher, including 50% or higher, such as 75% or even higher. Contact protocols of interest include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

At precipitation step 20, carbonate compounds, which may be amorphous or crystalline, are precipitated. Precipitation conditions of interest include those that change the physical environment of the water to produce the desired precipitation material. For example, the temperature of the water may be raised to an amount suitable for precipitation of the desired carbonate compound(s) to occur. In such embodiments, the temperature of the water may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitation material. In certain embodiments, the temperature is raised using energy generated from low or zero carbon dioxide emission sources, e.g., solar energy source, wind energy source, hydroelectric energy source, etc. While the pH of the water may range from 7 to 14 during a given precipitation process, in certain embodiments the pH is raised to alkaline levels in order to drive the precipitation of carbonate compound as desired. In certain of these embodiments, the pH is raised to a level that minimizes if not eliminates $CO_2$ gas generation production during precipitation. In these embodiments, the pH may be raised to 10 or higher, such as 11 or higher. Where desired, the pH of the water is raised using any convenient approach. In certain embodiments, a pH-raising agent may be employed, where examples of such agents include oxides, hydroxides (e.g., sodium hydroxide, potassium hydroxide, brucite), carbonates (e.g. sodium carbonate) and the like. The amount of pH-elevating agent that is added to the saltwater source will depend on the particular nature of the agent and the volume of saltwater being modified, and will be sufficient to raise the pH of the saltwater source to the desired value. Alternatively, the pH of the saltwater source can be raised to the desired level by electrolysis of the water.

$CO_2$ charging and carbonate compound precipitation may occur in a continuous process or at separate steps. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

Following production of the carbonate-containing precipitation material from the water, the resultant precipitation material (i.e., resultant $CO_2$-sequestering component of building materials) may be separated from some or all the mother liquor to produce separated precipitation material, as illustrated at step 40 of FIG. 1. Separation of the precipitation material may be achieved using any convenient approach, including a mechanical approach, e.g., where bulk excess water is drained from the precipitation material, e.g., either by gravity alone or with the addition of vacuum, mechanical pressing, by filtering the precipitation material from the mother liquor to produce a filtrate, etc. For exemplary system and methods for bulk water removal that may be used in the invention, see U.S. Provisional Patent Application Nos. 61/158,992, filed 10 Mar. 2009; 61/168,166, filed 9 Apr. 2009; 61/170,086, filed 16 Apr. 2009; 61/178,475, filed 14 May 2009; 61/228,210, filed 24 Jul. 2009; 61/230,042, filed 30 Jul. 2009; and 61/239,429, filed 2 Sep. 2009, each of which is incorporated herein by reference. Separation of bulk water produces a wet, dewatered precipitation material (i.e., dewatered $CO_2$-sequestering component of building materials).

The resultant dewatered precipitation material may be used directly, or the resultant dewatered precipitation material may be further dried. In some embodiments, the resultant dewatered precipitation material is used directly. Directly using the resultant dewatered precipitation material is convenient in applications that require some amount of water. In a non-limiting example, dewatered precipitation material may be mixed with ordinary Portland cement, wherein the dewatered precipitation material provides at least a portion of the water needed for hydration and placement of the cement mixture. In some embodiments, the dewatered precipitation material is more than 5% water, more than 10% water, more than 20% water, more than 30% water, more than 50% water, more than 60% water, more than 70% water, more than 80% water, more than 90% water, or more than 95% water. In some embodiments, the dewatered precipitation material provides at least 5% of the water, at least 10% of the water, at least 20% of the water, at least 30% of the water, at least 40% of the water, at least 50% of the water, at least 60% of the water, at least 70% of the water, at least 80% of the water, at least 90% of the water, or at least 95% of the water needed for the application that the dewatered precipitation material is being used. In some embodiments, the dewatered precipitation material provides all of the water needed for the application that the dewatered precipitation material is being used. For example, the dewatered precipitation material may provide all of the water needed for hydration and placement of a cement mixture of dewatered precipitation material and ordinary Portland cement. For instance, precipitation material may be dewatered such that the dewatered precipitation material comprises nearly 70% water, such as 66.5% water. The slurry of precipitation material may then be mixed with ordinary Portland cement such that the resultant cement mixture comprises 80% ordinary Portland cement and 20% precipitation material, wherein the water to cement (i.e., ordinary Portland cement and precipitation material) ratio is about 40%. By controlling the amount of water that is removed from the precipitation material, the carbon footprint of the material (e.g., concrete, formed building material of the invention, etc.) being made from the precipitation material is being controlled as well, especially if the material requires water. With this in mind, the low, neutral, or negative carbon footprint of any of the product materials described herein may be further reduced by removing only as much water as needed from the precipitation material.

As described above, the resultant dewatered precipitation material may also be dried to produce a product, as illustrated at step 60 of FIG. 1. Drying may be achieved by air-drying the filtrate. Where the filtrate is air dried, air-drying may be at room or elevated temperature. Dewatered precipitation material may be air dried to produce a precipitation material that is less than 50% water, less than 40% water, less than 30% water, less than 20% water, less than 10% water, or less than 5% water. For example, dewatered precipitation material may be air dried to produce a precipitin material that is 30% or less water. Such precipitation material may be crushed with or without additional processing (e.g., high sheer mixing) and combined with other materials such as ordinary Portland cement to produce a cement mixture comprising a portion of the water needed for hydration and placement of the cement mixture. Drying may also be achieved by spray drying the precipitation material, where the liquid containing the precipitation material is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the dewatered precipitation material from the separation reactor 40 may be washed before drying, as illustrated at optional step 50 of FIG. 1. The precipitation material may be washed with freshwater, e.g., to remove salts (such as NaCl) from the dewatered precipitation material. Used wash water may be disposed of as convenient, e.g., by disposing of it in a tailings pond, etc.

At step 70, the dried precipitation material is optionally refined, e.g., to provide for desired physical characteristics, such as particle size, surface area, etc., or to add one or more components to the precipitation material, such as admixtures, aggregate, supplementary cementitious materials, etc., to produce a final product 80.

In certain embodiments, a system is employed to perform the above methods.

Following production of the carbonate/bicarbonate component (e.g., $CO_2$-sequestering component), for example, as described above, the carbonate/bicarbonate component (e.g., $CO_2$-sequestering component) is then employed to produce a formed building material of the invention. Formed building materials of the invention may be prepared in accordance with traditional manufacturing protocols for such structures, with the exception that an amount of carbonate/bicarbonate (e.g., $CO_2$-sequestering component) of the invention is employed. The portion of components replaced with the carbonate/bicarbonate component (e.g., $CO_2$-sequestering component) may vary, and in certain instances is 5% by weight or more, including 10% by weight or more, 25% by weight or more, 50% by weight or more, 75% by weight or more, 90% by weight or more, or even 100% by weight. In producing the formed building materials, an amount of the carbonate/bicarbonate component (e.g., $CO_2$-sequestering component) may be combined with water and other additional components, which may include, but are not limited to clay, shale, soft slate, calcium silicate, quarried stone, Portland cement, fly ash, slag cement, aggregate (e.g., blast furnace slag, bottom ash, gravel, limestone, granite, sand, etc.), silica fume, pozzolans, reinforcing materials, such as steal or polymeric structures, etc., and then shaped into the final desired building material structure. Fabrication protocols may include extrusion, with or without heat of dry powder, powder made into a paste with fresh water, slurry from reactor, etc. Also of interest are fabrication protocols that include the use of rollers, e.g., to make a sheet, or rollers with impressions to make shapes. In addition, compression molding fabrication protocols may find use, e.g., dry molding, adding some water and molding, followed in some instances with sintering, etc. Fabrication protocols may include adding water (with or without additional binders such as plastics, Portland cement, etc.) to a dry composition of the material (e.g., $CO_2$-sequestering material), and casting the articles. Certain protocols may include heating the material to produce a foamed material via water turning into internal steam. Also of interest are protocols where amounts of the product (e.g., $CO_2$-sequestering product) are maintained in an outdoor location so that they get rained on, recycling fresh water through the material to dissolve the metastable form and reprecipitate as a stable form, letting it stand in water for a time at room or elevated temp, and then producing the formed material from the set product.

Material that is not used to produce formed building materials may be used as amorphous building material. As with formed building materials, a substantial carbon reduction may result from using amorphous building material. For example, a substantial carbon reduction may result from combining both the cement credit (i.e., the $CO_2$ avoided) from offsetting the use of Portland cement and the quantity of sequestered carbon from fossil point sources. Each ton of material comprising a carbonate/bicarbonate component (e.g., $CO_2$-sequestering component) of the invention may result in a $CO_2$ reduction of up to 1 ton or more, such as 1.2 tons or more, including 1.6 tons or more, for example 2 tons or more of $CO_2$. Various binary, ternary, quaternary, etc. blends comprising a carbonate/bicarbonate (e.g., $CO_2$-sequestering component) of the invention may result in such reductions. Whether for a formed or amorphous building material, the carbonate/bicarbonate component (e.g., $CO_2$-sequestering component) may be employed as, for example, supplementary cementitious material (SCM) in conjunction with fly ash, slag, and/or Portland cement to produce a blended cement with a low, neutral (i.e., zero), or negative carbon footprint. Such blended cement may also have a compressive strength at or above 1,000 psi, including at or above 2,000 psi, e.g., at or above, 2,500 psi in 28 days or less, e.g., 14 days or less. As such, a blended cement of the invention with a low, neutral, or negative carbon footprint may produce quality concrete suitable for use in concrete pavement applications.

Also provided herein are low, neutral, and negative carbon footprint concrete mixes for use as an amorphous building material or in a formed building material. In some embodiments, low, neutral, or negative carbon footprint concrete mixes comprise a blended cement (e.g., $CO_2$-sequestering supplementary cementitious material (SCM) in conjunction with fly ash, slag, and/or Portland cement) and a $CO_2$-sequestering aggregate (e.g., the aggregate being coarse aggregate; fine aggregate such as sand; etc.), which aggregate is prepared from a carbonate/bicarbonate component (e.g., $CO_2$-sequestering component) of the invention in accordance with U.S. patent application Ser. No. 12/475,378, filed 29 May 2009, which is incorporated herein by reference. Such compositions may include, for example, a fine aggregate (e.g., sand) that has a sequestered $CO_2$ content of approximately 20% or more, e.g., 35% or more, including 50% or more. In some embodiments, the compressive strength of the concrete low, neutral, or negative carbon concrete is 2,500 psi or more at 28 days, e.g., 3000 psi or more, including 4,000 psi at 28 days. Some embodiments provide a carbon negative footprint concrete, which exhibits compressive strengths of 4,000 psi at 28 days. Equal early strengths (i.e., at 28 days) allow for the use of low, neutral, or negative carbon footprint concrete without negatively affecting construction schedules.

Embodiments of the invention achieve a low, neutral, or negative carbon footprint concrete, which not only meets the strength and early strength criteria (above), but also finishes like normal concrete. Blended cement-concrete compositions of the invention behave in a fashion similar to conventional Portland cement-concrete compositions enabling the invention to be used in similar places and for similar functions. In some embodiments, blended cement-concrete compositions may be used in formed building materials of the invention. In some embodiments, blended cement-concrete compositions of the invention may be used for amorphous building material. For example, blended cement-concrete compositions may be placed into parking areas (e.g. a 5,000 square foot parking lot). Blended cement-concrete compositions, due to the higher albedo of such compositions, reduce carbon emissions via reduced lighting demands. This reduction of carbon emissions may occur over the lifetime of the blended cement-concrete compositions. For example, albedo and luminance measurements of low, neutral, or negative carbon footprint concrete parking areas compared to asphalt parking areas may be used to determine the difference in lighting needed and, thus, the level of carbon reduction that is possible due to the use of higher albedo concrete compositions of the invention. Albedo tests of such compositions demonstrate urban heat island reduction abilities, e.g., by 2-fold or more, 5-fold or more, 10-fold or more, 20-fold or more.

Utility

Building materials of the invention find use in a variety of different applications. Specific structures in which the building materials of the invention find use include, but are not limited to: buildings (both commercial and residential), infrastructure, e.g., walls, sound barriers, pipes, etc., and other man-made structures.

The subject methods and systems find use in $CO_2$ sequestration, particularly via sequestration in the built environment. Sequestering $CO_2$ comprises removal or segregation of $CO_2$ from the gaseous stream, such as a gaseous waste stream, and fixating it into a stable non-gaseous form so that the $CO_2$ cannot escape into the atmosphere. $CO_2$ sequestration comprises the placement of $CO_2$ into a storage stable form, e.g., a component of the built environment, such as a building, road, dam, levee, foundation, etc. As such, sequestering of $CO_2$ according to methods of the invention results in prevention of CO$_2$ gas from entering the atmosphere and long-term storage of CO$_2$ in a manner that CO$_2$ does not become part of the atmosphere. By storage stable form is meant a form of matter that can be stored above ground or underwater under exposed conditions (i.e., open to the atmosphere, underwater environment, etc.) without significant, if any, degradation for extended durations, e.g., 1 year or longer, 5 years or longer, 10 years or longer, 25 years or longer, 50 years or longer, 100 years or longer, assuming the building material of interest is maintained in its normal environment of its intended use.

The following examples are put forth so as to provide those of ordinary skill in the art with a complete disclosure and description of how to make and use the invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

EXAMPLES

Example 1

Preparation of Precipitation Material for Use as Supplementary Cementitious Material in Concrete 900 gallons of seawater was pumped at approximately 20 gallons per minute into a 1000-gallon tank with a covered headspace. Open access ports open for agitation, instrumentation, tank entry, and reagent addition were located on the top of the tank. An array of gas spargers was located in the bottom for sparging a carbon dioxide/air mixture. Approximately 30% (v/v) of the gas mixture sparged through the reactor was carbon dioxide gas. The seawater was agitated with an overhead mixer as the gas was sparged into the tank at a total flow rate of 40-50 lpm. The initial seawater temperature ranged from 15 to 20° C.

An aqueous solution of 50% sodium hydroxide (w/w) was pumped into the agitated, sparging vessel to maintain a pH of approximately pH 9.0. An automatic controller to maintain the desired pH adjusted the flow rate of the sodium hydroxide.

After 12 kg of 50% sodium hydroxide was added to the agitated, sparging vessel, both the caustic addition and the carbon dioxide gas flow to the vessel were ceased. The air continued to be sparged into the vessel and agitation maintained until the gas lines were purged of carbon dioxide. The air sparging was then ceased, but agitation maintained to keep the slurry in suspension. The final slurry temperature ranged from 15 to 25° C.

The resultant slurry was pumped to another covered tank with a conical bottom and outlet port at the bottom. The slurry was allowed to settle overnight. The supernatant was decanted the next day, and the settled slurry vacuum filtered.

The filter cake was re-suspended in fresh water to generate a pump able slurry for spray drying. The slurry was spray dried and the product collected from the spray dryer product collection cyclone.

X-ray fluorescence ("XRF") (Table 1) and coulometry (Table 2) data indicate that the precipitation material is mostly composed of calcium carbonate.

TABLE 1

XRF elemental analysis of precipitation material

| | Na | Mg | Al | Si | S | Cl | K | Ca | Fe |
|---|---|---|---|---|---|---|---|---|---|
| Weight % | 1.44 | 0.27 | 0.22 | 0.24 | 0.14 | 1.52 | 0.01 | 37.99 | 0.14 |

TABLE 2

Percent CO$_2$ content (coulometry)

| | % CO$_2$ |
|---|---|
| Weight % | 40.85 |

X-ray diffraction ("XRD") analysis (FIG. 2) of the precipitation material indicates the presence of aragonite (CaCO$_3$) as the major phase, and halite (NaCl) as a minor component.

Scanning electron microscope (SEM) images of the precipitation material at 1000× (left) and 4000× (right) are provided as well (FIG. 3).

Example 2

Formed Materials

A. Concrete Cylinder (or Post)

A concrete cylinder was made from a batch of concrete prepared with spray-dried precipitation material such as that described in Example 1. The precipitation material was used as a supplementary cementitious replacement of Portland cement, replacing 17% by mass of the Portland cement. The batch was mixed in a small mixing drum using the following mix weights:

| | |
|---|---|
| Portland Cement | 13.98 lbs |
| Fly Ash | 3.55 lbs |
| Aragonite precipitate | 3.70 lbs |
| Water | 9.4 lbs |
| Sand | 45.74 lbs |
| Small coarse aggregate | 8.58 lbs |
| Medium coarse aggregate | 51.46 lbs |
| Large coarse aggregate | 8.58 lbs |

Cylinders measuring 4"×8" were formed according to ASTM C31. Each cylinder was consolidated in two equal layers and tamped 25 times each layer with a ⅜" rod. The cylinders were then finished with a concrete trowel and capped. The integrity of the cylinders allowed for cutting the cylinders into 0.75"-1.5" thick sections, which sections were then polished on both sides.

B. Modified Concrete Tile

A filter cake of precipitation material prepared as in Example 1 was spray dried to a moisture content of approximately 4%. The spray-dried material was then dry blended with ordinary type-V Portland cement in a 4:1 ratio (ordinary Portland cement:spray-dried precipitation material) to obtain a total cementitious mixture. The total cementitious mixture was combined with fine aggregate, coarse aggregate, and water to form a concrete mixture. The products were mixed together in a small concrete mixing drum. The amounts added were as follows: 48.4 lb total cementitious (9.7 lb carbonate aragonite, 38.7 lb type-V Portland cement), 24.2 lb tap water, 111 lb fine aggregate, and 136 lb coarse aggregate. The concrete mixture was removed from the mixing drum into a wheelbarrow. The concrete was then scooped from the wheelbarrow into forms of the tile. The tile dimensions were 609.6 mm×609.6 mm×88.9 mm, approximately three times thicker (i.e., "modified") than tiles described hereinabove. The concrete was consolidated into the forms using a ⅝" tamping rod to prevent bug-holes. The tile was screeded and smooth-trowel finished. The following day, forms were removed yielding a modified concrete tile.

All examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein as such embodiments are provided by way of example only. Indeed, numerous variations, changes, and substitutions may now occur to those skilled in the art without departing from the invention. It is intended that the following claims define the scope of the invention and that methods and structures within the scope of these claims and their equivalents be covered thereby.

What is claimed is:

1. A method for producing a formed building material comprising:
    a) contacting a gaseous waste stream comprising a $CO_2$ with water comprising proton removing agent to form a $CO_2$ charged water;
    b) producing a $CO_2$-sequestering component from a salt-water solution of divalent cations and the $CO_2$ charged water under one or more of precipitation conditions favoring precipitation of the $CO_2$-sequestering component comprising a metastable carbonate comprising amorphous calcium carbonate, vaterite, aragonite, or combinations thereof; and
    c) forming the formed building material from the $CO_2$-sequestering component in a process comprising contacting the $CO_2$-sequestering component with water, wherein the formed building material is selected from the group consisting of
    a) a brick having a compressive strength ranging from 5 to 100 MPa;
    b) a block having a compressive strength ranging from 5 to 100 MPa;
    c) a tile having a compressive strength ranging from 5 to 75 MPa;
    d) a cement board having a compressive strength ranging from 5 to 50 MPa;
    e) a drywall having a compressive strength ranging from 1 to 20 MPa;
    f) a conduit having a compressive strength ranging from 5 to 75 MPa;
    g) a beams having a compressive strength ranging from 35 to 150 MPa;
    h) a basin having a compressive strength ranging from 5 to 60 MPa;
    i) a column having a compressive strength ranging from 25 to 200 MPa;
    j) a fiber-cement siding having a compressive strength ranging from 2 to 25 MPa;
    k) a slab having a compressive strength ranging from 10 to 100 MPa;
    l) acoustic barrier of at least 0.5 m in length; and
    m) insulation material.

2. The method of claim 1, wherein the gaseous waste stream further comprises NOx, SOx, VOCs, particulates, mercury, or a combination thereof.

3. The method of claim 1, wherein the formed building material comprises 50% (w/w) $CO_2$-sequestering component or more.

4. The method of claim 1, wherein the $CO_2$-sequestering component further comprises bicarbonates.

5. The method of claim 1, wherein the carbonates has a $\delta^{13}C$ less than −5‰.

6. The method of claim 1, wherein the $CO_2$-sequestering component further comprises calcite, ikaite, magnesite, barringtonite, nesquehonite, landfordite, amorphous magnesium carbonate, or a combination thereof.

7. The method of claim 1, wherein the carbonates are metastable such that upon contact with freshwater, the carbonates reprecipiate into freshwater stable compounds.

8. The method of claim 1, wherein the $CO_2$-sequestering component further comprises calcium, magnesium, or a combination thereof.

9. The method of claim 1, further comprising contacting the $CO_2$-sequestering component with an additional component selected from the group consisting of clay, shale, soft slate, calcium silicate, quarried stone, Portland cement, fly ash, slag, aggregate, silica fume, pozzolans, and combination thereof.

10. The method of claim 1, wherein the $CO_2$-sequestering component further comprises co-products of NOx, SOx, VOCs, particulates, mercury, or a combination thereof resulting from conditions used to convert carbon dioxide to carbonates.

11. The method of claim 10, wherein the $CO_2$-sequestering component further comprises sulfates.

12. The method of claim 1, wherein producing the $CO_2$-sequestering component comprises precipitating the $CO_2$-sequestering component.

13. The method of claim 1, wherein precipitating the $CO_2$-sequestering component comprises utilizing a low-voltage electrochemical method for removing protons from the solution of divalent cations and the gaseous waste stream comprising $CO_2$.

14. The method of claim 1, wherein producing the $CO_2$-sequestering component further comprises dewatering the $CO_2$-sequestering component after precipitating the $CO_2$-sequestering component, and wherein dewatering the $CO_2$-sequestering component produces a dewatered $CO_2$-sequestering component.

15. The method of claim 14, wherein the dewatered $CO_2$-sequestering component is directly used in forming the formed building material.

16. The method of claim 15, wherein at least some water for forming the formed building material is provided by the $CO_2$-sequestering component.

17. The method of claim 1, wherein forming the building material comprises molding, casting, cutting, extruding, sculpting, rolling, compacting, or some combination thereof, the $CO_2$-sequestering component.

18. The method of claim 1, wherein the formed building material has a carbon footprint that is neutral.

19. The method of claim 1, wherein the formed building material has a carbon footprint that is negative.

20. The method of claim 1, wherein the formed building material is the drywall.

* * * * *